United States Patent
Rossato et al.

(10) Patent No.: US 9,930,350 B2
(45) Date of Patent: Mar. 27, 2018

(54) ENCODING AND DECODING BASED ON BLENDING OF SEQUENCES OF SAMPLES ALONG TIME

(71) Applicants: Luca Rossato, Milan (IT); Guido Meardi, Milan (IT)

(72) Inventors: Luca Rossato, Milan (IT); Guido Meardi, Milan (IT)

(73) Assignee: V-Nova International Limited, London (GB)

(*) Notice: Subject to any disclaimer, the term of this patent is extended or adjusted under 35 U.S.C. 154(b) by 71 days.

(21) Appl. No.: 15/071,364

(22) Filed: Mar. 16, 2016

(65) Prior Publication Data

US 2016/0198168 A1 Jul. 7, 2016

Related U.S. Application Data

(62) Division of application No. 13/893,665, filed on May 14, 2013, now Pat. No. 9,313,495.

(Continued)

(30) Foreign Application Priority Data

May 13, 2013 (WO) ................. PCT/EP2013/059833

(51) Int. Cl.
| | |
|---|---|
| *G06K 9/36* | (2006.01) |
| *H04N 19/30* | (2014.01) |
| *G06T 9/00* | (2006.01) |
| *H04N 19/40* | (2014.01) |
| *G06T 9/40* | (2006.01) |
| *H04N 19/573* | (2014.01) |

(Continued)

(52) U.S. Cl.
CPC ............... *H04N 19/30* (2014.11); *G06T 9/00* (2013.01); *G06T 9/40* (2013.01); *H04N 19/40* (2014.11); *H04N 19/57* (2014.11); *H04N 19/573* (2014.11); *H04N 5/145* (2013.01)

(58) Field of Classification Search
CPC ........ H04N 19/30; H04N 19/40; H04N 19/57; H04N 19/573; H04N 5/145; G06T 9/00; G06T 9/40
USPC .................................................. 382/232–233
See application file for complete search history.

(56) References Cited

U.S. PATENT DOCUMENTS

| | | |
|---|---|---|
| 4,941,193 A | 7/1990 | Barnsley et al. |
| 5,991,444 A | 11/1999 | Burt et al. |

(Continued)

OTHER PUBLICATIONS

Watanabe, Hiroshi et al., "Sprite Coding in Object-Based Video Coding Standard: MPEG-4", Multiconference on Systemics, Cybernetics and Informatics, Jul. 2001, Total Pages 6 (pp. 420-425), Japan.

(Continued)

*Primary Examiner* — Kanjibhai Patel
(74) *Attorney, Agent, or Firm* — Chapin IP Law, LLC

(57) ABSTRACT

Computer processor hardware receives image data specifying element settings for each image of multiple original images in a sequence. The computer processor hardware analyzes the element settings across the multiple original images. The computer processor hardware then utilizes the element settings of the multiple original images in the sequence to produce first encoded image data specifying a set of common image element settings, the set of common image element settings being a baseline to substantially reproduce each of the original images in the sequence.

22 Claims, 20 Drawing Sheets

Related U.S. Application Data

(60) Provisional application No. 61/646,797, filed on May 14, 2012, provisional application No. 61/647,426, filed on May 15, 2012.

(51) Int. Cl.
*H04N 19/57* (2014.01)
*H04N 5/14* (2006.01)

(56) References Cited

U.S. PATENT DOCUMENTS

| | | | | |
|---|---|---|---|---|
| 7,424,163 | B1* | 9/2008 | Ellis | H04N 19/13 |
| | | | | 382/232 |
| 8,208,739 | B2* | 6/2012 | Agthe | H04N 19/51 |
| | | | | 382/232 |
| 8,503,533 | B1* | 8/2013 | Masterson | H04N 7/012 |
| | | | | 375/240.16 |
| 8,953,679 | B2* | 2/2015 | Kim | H04N 19/105 |
| | | | | 375/240.12 |
| 9,319,683 | B2* | 4/2016 | Lim | H04N 19/176 |
| 9,344,702 | B2* | 5/2016 | Bruls | H04N 13/004 |
| 9,609,320 | B2* | 3/2017 | Naing | H04N 19/51 |
| 9,648,341 | B2* | 5/2017 | Laroche | H04N 19/52 |
| 2006/0126741 | A1 | 6/2006 | Saito et al. | |
| 2008/0144716 | A1 | 6/2008 | De Haan | |
| 2008/0247462 | A1 | 10/2008 | Demos | |
| 2009/0232212 | A1 | 9/2009 | Amon | |
| 2010/0034296 | A1 | 2/2010 | Cunha et al. | |
| 2011/0249745 | A1 | 10/2011 | Chen et al. | |

OTHER PUBLICATIONS

Dasu, Aravind et al., "A Wavelet-Based Sprite Codec", IEEE Transactions on Circuits and Systems for Video Technology, Feb. 2004, Total Pages 12 (pp. 244-255), vol. 14 No. 2, IEEE, New York.

Wu, Feng et al., "Efficient Background Video Coding With Static Sprite Generation and Arbitrary-Shape Spatial Prediction Techniques", IEEE Transactions on Circuits and Systems for Video Technology, May 2003, Total Pages 12 (pp. 394-405), vol. 13 No. 5, IEEE, New York.

Irani, Michal et al., "Efficient Representations of Video Sequences and Their Applications", Signal Processing: Image Communication, May 1996, Total Pages 26 (pp. 327-351), vol. 8 No. 4, Elsevier, USA.

Ebrahimi, Touradj et al., "MPEG-4 Natural Video Coding—An Overview", Signal Processing: Image Communication, Jan. 2000, Total Pages 21 (pp. 365-385), vol. 15, Elsevier Science, USA.

Zhang, HongJiang et al., "Automatic Partitioning of Full-Motion Video", Multimedia Systems, Jan. 1993, Total Pages 20 (pp. 10-28), vol. 1 No. 1, Springer-Verlag, Germany.

International Search Report from corresponding PCT application No. PCT/EP2013/059833, dated Oct. 24, 2013, total pages 9.

Beong-Jo, Kim, et al., "Low Bit-Rate Scalable Video Coding with 3-D Set Partitioning in Hierarchical Trees (3-D SPIHT)", IEEE Transactions on Circuits and Systems for Video Technology, Dec. 1, 2000, vol. 10, No. 8, Entire document.

Hartung, Frank, et al., "Digital Rights Management and Watermarking of Multimedia Content for M-Commerce Applications", Nov. 1, 2000, vol. 38, No. 11, Total Pages 7 (pp. 78-84), IEEE Communications Magazine.

Written Opinion, Intellectual Property Office of Singapore; 11201407508R, dated Dec. 6, 2016, pp. 1-5.

* cited by examiner

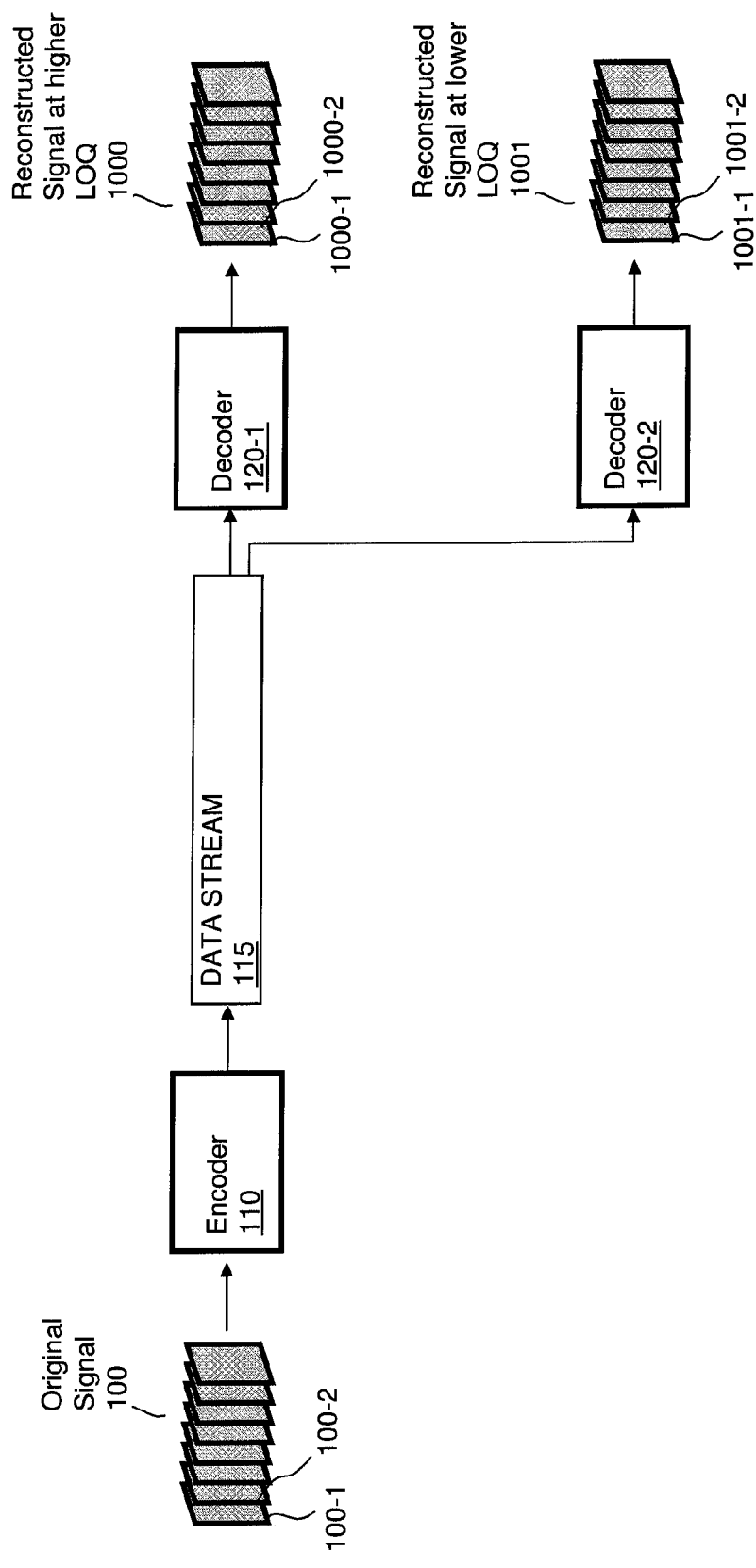

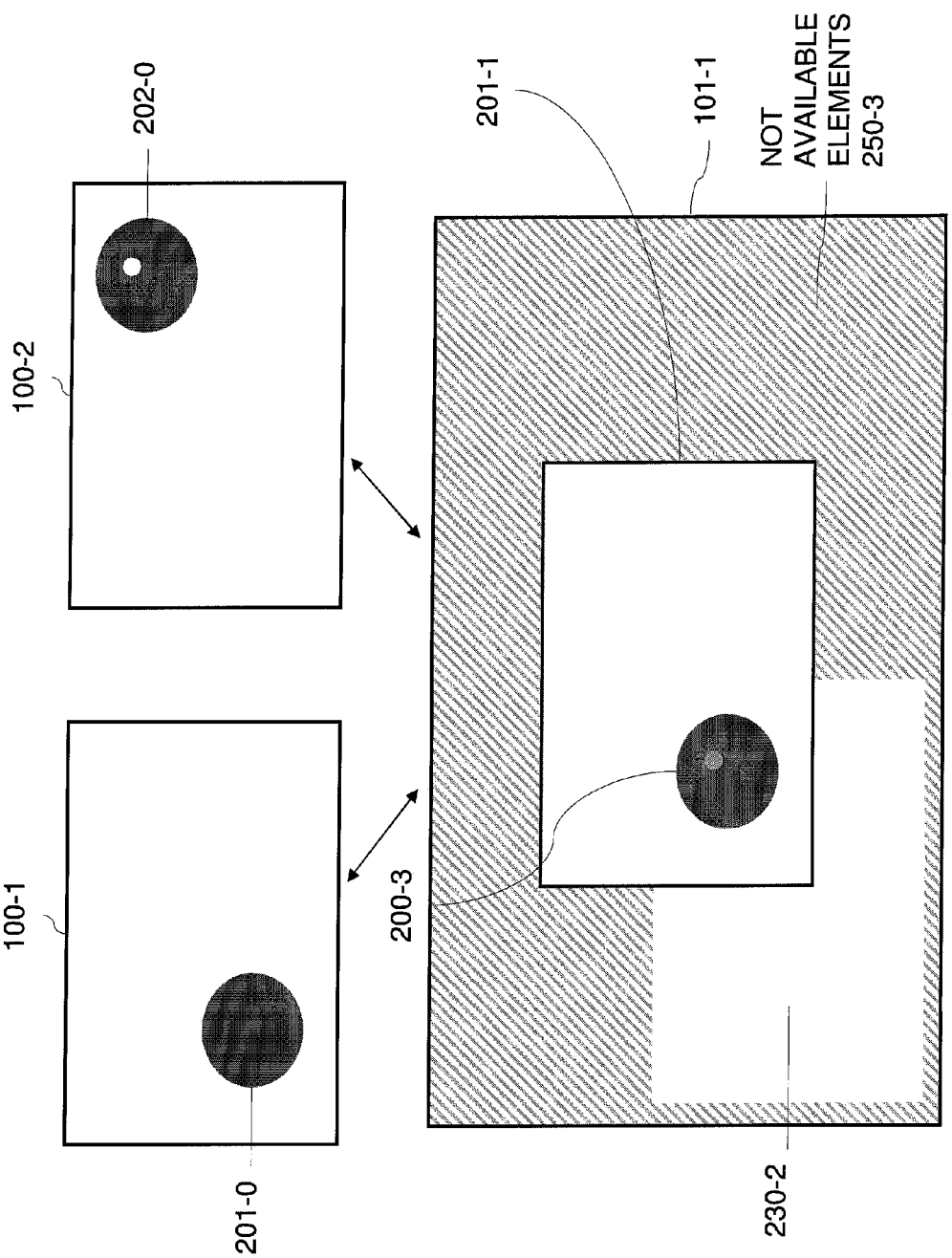

ENCODING AND DECODING BASED ON BLENDING OF SEQUENCES OF SAMPLES ALONG TIME

RELATED APPLICATIONS

This application is a divisional application of earlier filed U.S. patent application Ser. No. 13/893,665 entitled "ENCODING AND DECODING BASED ON BLENDING OF SEQUENCES OF SAMPLES ALONG TIME,", filed on May 14, 2013, the entire teachings of which are incorporated herein by this reference.

U.S. patent application Ser. No. 13/893,665 is related and claims the benefit of U.S. Provisional Patent Application Ser. No. 61/646,797 entitled "SIGNAL ENCODING, DECODING AND RECONSTRUCTION OF TIME-BASED AND/OR MULTIDIMENSIONAL SIGNALS BASED ON MULTIDIMENSIONAL TIER-BASED INHERITANCE", filed on May 14, 2012, the entire teachings of which are incorporated herein by this reference.

U.S. patent application Ser. No. 13/893,665 is related to and claims the benefit of U.S. Provisional Patent Application Ser. No. 61/647,426 entitled "ESTIMATION, ENCODING, DECODING AND USAGE OF MOTION INFORMATION IN MULTIDIMENSIONAL SIGNALS THROUGH MOTION ZONES, MOTION MATRIXES, WARP MAPS AND MOTION TRANSFORMS", filed on May 15, 2012, the entire teachings of which are incorporated herein by this reference.

U.S. patent application Ser. No. 13/893,665 is also related to U.S. patent application Ser. No. 13/188,188 entitled "INHERITANCE IN A TIERED SIGNAL QUALITY HIERARCHY,", filed on Jul. 21, 2011, the entire teachings of which are incorporated herein by this reference.

U.S. patent application Ser. No. 13/893,665 is related to U.S. patent application Ser. No. 13/188,201 entitled "TIERED SIGNAL DECODING AND SIGNAL RECONSTRUCTION,", filed on Jul. 21, 2011, the entire teachings of which are incorporated herein by this reference.

U.S. patent application Ser. No. 13/893,665 is related to U.S. patent application Ser. No. 13/188,207 entitled "SIGNAL PROCESSING AND TIERED SIGNAL ENCODING, ", filed on Jul. 21, 2011, the entire teachings of which are incorporated herein by this reference.

This application is related to U.S. patent application Ser. No. 13/188,220 entitled "UPSAMPLING IN A TIERED SIGNAL QUALITY HIERARCHY,", filed on Jul. 21, 2011, the entire teachings of which are incorporated herein by this reference.

U.S. patent application Ser. No. 13/893,665 is related to U.S. patent application Ser. No. 13/188,226 entitled "SIGNAL PROCESSING AND INHERITANCE IN A TIERED SIGNAL QUALITY HIERARCHY,", filed on Jul. 21, 2011, the entire teachings of which are incorporated herein by this reference.

U.S. patent application Ser. No. 13/893,665 is related to U.S. patent application Ser. No. 13/352,944 entitled "SIGNAL ANALYSIS AND GENERATION OF TRANSIENT INFORMATION,", filed on Jan. 18, 2012, the entire teachings of which are incorporated herein by this reference.

U.S. patent application Ser. No. 13/893,665 is related to U.S. Provisional Patent Application Ser. No. 61/563,169 entitled "TIER-BASED SYSTEM TO SEPARATE A MULTIDIMENSIONAL SIGNAL INTO STABLE/PREDICTABLE INFORMATION AND TRANSIENT INFORMATION,", filed on Nov. 23, 2011, the entire teachings of which are incorporated herein by this reference.

U.S. patent application Ser. No. 13/893,665 is related to U.S. patent application Ser. No. 13/188,237 entitled "TRANSMISSION OF RECONSTRUCTION DATA IN A TIERED SIGNAL HIERARCHY,", filed on Jul. 21, 2011, the entire teachings of which are incorporated herein by this reference.

U.S. patent application Ser. No. 13/893,665 is related to U.S. Provisional Patent Application Ser. No. 61/558,302 entitled "UPSAMPLING AND DOWNSAMPLING OF MOTION MAPS AND OTHER AUXILIARY MAPS IN A TIERED SIGNAL QUALITY HIERARCHY,", filed on Nov. 10, 2011, the entire teachings of which are incorporated herein by this reference.

U.S. patent application Ser. No. 13/893,665 is related to U.S. patent application Ser. No. 13/303,554 entitled "UPSAMPLING AND DOWNSAMPLING OF MOTION MAPS AND OTHER AUXILIARY MAPS IN A TIERED SIGNAL QUALITY HIERARCHY,", filed on Nov. 23, 2011, the entire teachings of which are incorporated herein by this reference.

U.S. patent application Ser. No. 13/893,665 is related to U.S. Provisional Patent Application Ser. No. 61/587,989 entitled "DISTINCT ENCODING/DECODING OF STABLE/PREDICTABLE INFORMATION AND TRANSIENT/STOCHASTIC INFORMATION,", filed on Jan. 18, 2012, the entire teachings of which are incorporated herein by this reference.

U.S. patent application Ser. No. 13/893,665 is related to U.S. patent application Ser. No. 13/744,808 entitled "DISTINCT ENCODING AND DECODING OF STABLE INFORMATION AND TRANSIENT/STOCHASTIC INFORMATION", filed on Jan. 18, 2013, the entire teachings of which are incorporated herein by this reference.

BACKGROUND

Many techniques are known in the art to deal with encoding and decoding of digital signals. This is the case of audio signals, pictures, video signals and other multidimensional signals like volumetric signals used in scientific and medical areas. In order to achieve high compression ratios, those techniques exploit the spatial and time correlation inside the signal.

Conventional methods identify a reference and try to determine the difference of the signal between a current location and the given reference. This is done both in the spatial domain, where the reference is a portion of already received and decoded spatial plane, and in the time domain, where a single instance in time of the signal (e.g., a video frame in a sequence of frames) is taken as a reference for a certain duration. This is the case, for example, of MPEG-family (Moving Pictures Expert Group) compression algorithms, where previously-decoded macro blocks are taken as reference in the spatial domain and I-frames and P-frames are used as reference in the time domain.

Known techniques exploit spatial correlation and time correlation in many ways, adopting several different techniques in order to identify, simplify, encode and transmit differences ("residual data").

In accordance with conventional methods, in order to leverage on spatial correlation, a domain transformation is performed (for example into a frequency domain) and then lossy deletion and quantization of information is performed. In the time domain, instead, conventional methods transmit the quantized difference between the current sample and a reference sample. In order to maximize the similarity between samples, encoders try to estimate the modifications along time occurred vs. the reference signal. This is called, in conventional encoding methods (e.g., MPEG family technologies, VP8, etc.), motion estimation. Motion information is transmitted to a corresponding decoder in order to enable reconstruction of the current sample by leveraging information already available at the decoder for the reference sample (in MPEG this is done using motion vectors on a macro block basis).

A drawback of conventional reference-based encoding techniques is that errors in a sample cumulate with errors in the following samples that are each reconstructed based on a precedent sample, creating visible artifacts after very few sequentially predicted samples as soon as lossy compression techniques are adopted.

A common approach is to partition the signal to reduce the complexity of the encoding and decoding operations. This is done both in the spatial domain, for example using the concept of macro blocks or slices, and in the time domain, where the current state of the art approach is to use a Group of Pictures (GOP) division along time.

The partition process is usually abrupt and prone to artifacts. An example is the macro block segmentation performed in MPEG methods. While compression efficiency is indeed achieved, it is also true that visible artifacts are introduced. These artifacts are, in many conditions, very evident to human observers due to the fact that they are unrelated to the original signal (e.g., two notable examples are "block" type artifacts and ringing artifacts). Many attempts to reduce the visibility of such artifacts have been implemented (e.g., de-blocking and de-ringing filters both on the encoder and the decoder side) although with disadvantages such as a reduced global perceived quality and an increased complexity.

Along the time dimension, conventional methods divide the samples in chunks (e.g., GOP for video signals, where each sample along time is a picture). A reference sample is chosen (the reference image), normally on the basis of sequential order, and the samples in the chunk are transmitted differentially with respect to the reference (or with respect to two references, in the case of bi-predicted frames). This introduces artifacts in the time evolution of the signal (e.g., for significant movements the quality perceived often suffers from evident discontinuities along the edges of the GOP).

One requirement addressed by methods in the known art is compression efficiency. Computational complexity has always been considered as a second priority: essentially, algorithms just had to be computationally feasible, rather than being designed for low computation complexity. This forced hardware manufacturers to continuously adapt to evolving techniques, designing specific processors and dedicated hardware solutions capable to implement the chosen algorithms. An example is the evolution of hardware support for MPEG2, MPEG4, H.264/AVC, H.265/HEVC, etc. No encoding technology so far was designed so as to be optimally executed on massively parallel hardware, with computational performance that scales automatically based on the number of computing cores available (i.e., without having to adapt the code, or without even knowing in advance how many computing cores will be available). This feature, unfeasible with current methods, is especially important since nowadays hardware technology is reaching the asymptotic limit of silicon in terms of computing clock rates and transfer rate speed: the current trend to increase the available computing power is moving in the direction of increasing the number of distinct processing units ("computing cores") hosted in a single chip or system.

Another aspect neglected in the known art, aside from few attempts, is the quality scalability requirement. A scalable encoding method would encode a single version of the compressed signal and enable the delivery to different levels of quality, for instance according to bandwidth availability, display resolution and decoder complexity. Scalability has been taken into consideration in known methods like MPEG-SVC and JPEG2000, with relatively poor adoption so far due to computational complexity and, generally speaking, their use of approaches essentially designed for non-scalable techniques.

Another aspect not addressed by known methods is symmetry. With conventional methods compression efficiency can be achieved at the expense of renouncing to useful functionalities like bidirectional (e.g., time reverse) play back and more in general random access to any sample in the signal (e.g., frame-by-frame editing for video signals). Prediction techniques, especially along the time dimension, prevent the decoder to receive, decode and present the signal in time reversal order. Prediction techniques adopted also affect the behaviour in very compressed or error-prone transmissions, due to accumulation of artifacts. Artifacts introduced by errors are visible, especially due to their duration in time.

The prediction-driven techniques adopted in the known art also introduce strong constraints for random access into a compressed stream. Operations like "seek" towards a sample in an arbitrary point, random access when "zapping" to a different signal bitstream (without having to wait for the start of the next time-chunk/GOP) are currently unfeasible. The time that a user has to wait when trying to access an arbitrary point is currently in strict trade off with compression efficiency. An example of this phenomenon is the GOP constraint in MPEG family methods: in order to allow for minimum time delay and for random access along time, a GOP of one sample (i.e., intra-only encoding) must be used.

Lastly, current methods are unsuitable for very high sample rates (e.g., very high frame rates for video signals), due to the amount of computational power and bandwidth that would be required. Several studies, for instance, demonstrated that all humans can easily appreciate quality differences of video signals up to 300 frames per second, but computational and bandwidth constraints currently make it extremely expensive to encode and transmit high quality video signals at more than 25-60 frames per second.

BRIEF DESCRIPTION

Certain embodiments herein focus on improvements in techniques for encoding, transmitting and decoding residual data related to multiple samples of a signal, especially along dimensions of significant correlation for the signal.

According to one non-limiting example embodiment, a method includes encoding and reconstructing multiple sets of residual data based on a so-called support buffer (e.g., without limitation, a set of support elements). Some non-limiting embodiments also implement the method by generating a tiered hierarchy of support buffers. This method comprises an encoding step—during which sets of residual data are processed, generating support element information and relative residual data—and a decoding step, during which support element information is processed to generate predictions for residual data, which, combined with relative residual data, allow reconstruction of residual data.

Particular attention will be given to non-limiting embodiments in which said methods are used within the encoding and decoding loop of tiered hierarchical encoding methods, wherein a signal is encoded in a tiered hierarchy of samples that comprises two or more tiers, and wherein each of the tiers has a distinct level of quality (e.g., corresponding to the level of fidelity of the signal rendition). Such methods comprise a decoding step during which samples at a given level of quality are computed through reconstruction operations by starting from the samples of the tier that has the lowest level of quality. Embodiments illustrated herein are especially focused on non-limiting cases wherein a lower level of quality is a lower resolution (i.e., a coarser sampling grid) across one or more of the dimensions of the signal, although people skilled in the art can easily adapt the same methods to cases wherein a signal at a lower level of quality is a signal with the same resolution and a lower level of detail (e.g., without limitation, a coarser quantization of element values). In some cases, embodiments herein refer to a lower level of quality as a higher "level of aggregation" ("LOA") wherein the only subsampled dimension vs. a higher level of quality was the time dimension. The terms "tier" will be used interchangeably in the rest of the application with either "level of quality" ("LOQ") or "level of aggregation" ("LOA"), depending on the context.

For simplicity, the non-limiting embodiments illustrated herein usually refer to the signal as a sequence of multi-dimensional samples (i.e., sets of one or more elements organized as arrays with one or more dimensions) occurring at a given sample rate along the time dimension. In the description the terms "image" and/or "plane" (intended with the broadest meaning of "hyperplane", i.e., array of elements with any number of dimensions) will be often interchangeably used to identify the digital rendition of a sample of the signal along the sequence of samples, each plane having a given resolution for each of its dimension, and each suitable set of coordinates in the plane identifying a plane element (or "element", or "pel", for two-dimensional images often called "pixel", for volumetric images often called "voxel", etc.) characterized by one or more values or "settings" (e.g., by ways of non-limiting examples, color settings in a suitable color space, settings indicating density level, settings indicating temperature levels, settings indicating audio pitch, settings indicating amplitude, etc.). As non-limiting examples, a signal can be an image, an audio signal, a multi-channel audio signal, a video signal, a multi-view video signal (e.g., 3D video), a volumetric signal (e.g., medical imaging, scientific imaging, holographic imaging, etc.), a volumetric video signal, a plenoptic image, or even signals with more than four dimensions.

Embodiments illustrated herein will be particularly focused on signals evolving over time, especially due to lack of prior art. For instance, also very high sample rates (e.g., also over 1,000 frames per second, currently requiring inordinate amounts of computing and storage resources for encoding and decoding) are easily addressed by the described embodiments.

For simplicity, non-limiting embodiments illustrated herein often refer to signals that are displayed as sequences of 2D planes of settings (e.g., 2D images in a suitable color space), such as for instance a video signal including multiple images. However, the same concepts and methods are also applicable to any other types of time-based signal, and also to non-time-based multi-dimensional signals (e.g., two-dimensional pictures, volumetric/holographic images, plenoptic images, etc.). As a non-limiting example of a non-time-based signal, a series of two-dimensional slices of a CAT-scan or an MRI (i.e., a non-time-based three-dimensional signal) can be suitably represented as a series of two-dimensional samples along a dimension (i.e., the axis along which the slices were taken), and encoded/decoded according to methods illustrated herein, as if the axis along which the slices were taken was a time dimension (by assuming either a constant sample rate or even a variable sample rate, according to innovative methods illustrated herein).

Non-limiting embodiments of tiered hierarchies illustrated herein are characterized by tiers with different resolutions, wherein the downsampling scale factor from a higher tier to a lower tier may vary for each tier and for each dimension (both spatial and temporal).

Samples encoded in a tiered temporal hierarchy may have different durations. For example, a sample of a given tier resulting from the temporal downsampling ("blending", or "downblending" in case of combination of spatial downsampling and temporal downsampling) of two different samples of a higher tier represents a portion of the signal with a duration ("temporal span") that is the sum of the durations of the portions of the signal represented by each of the samples of the higher tier. In this document the term "span of the signal" or "span" will be used interchangeably with the terms "sample" (although more properly we may say that each given sample has a corresponding span, indicating that it corresponds to a "sample and hold" for a duration equal to its time span) and "image" (with the general meaning of plane of elements with any number of dimensions). A "span" of a signal at a given level of quality represents "a portion of the signal with a given sampling position and a given time duration, to be played back/displayed starting from a given moment in time". A span of a lower level of quality resulting from the combination (blending or downblending) of a plurality of spans of a higher level of quality will have a sampling position that is a linear or non-linear combination of the sampling positions of said multiple spans.

In a non-limiting embodiment, the integer sampling position of the highest level of quality that is equal or immediately lower than the mathematical average of the sampling positions of the spans of a higher level that were downsampled into the given span—or substantially the round-down of the average. Said resulting span will also have a duration that is the sum of the time durations of said multiple spans. Essentially, the term "span" reflects the fact that, especially when going down the hierarchy also with temporal downsampling, each span represents information that is better modelled as a "sample and hold"—representing values of the signal along a given time interval, i.e. a "span" of signal—rather than a simple "sample" in a very specific time position. Also, different spans of a same tier might have different durations, effectively representing variable sample rates.

Non-limiting embodiments of innovative methods illustrated herein often leverage some form of motion estimation and compensation techniques. In conventional methods, motion compensation is utilized as an alternative to predicting a portion of the image based on space correlation: i.e., these encoding techniques, for each portion of a reconstructed span (e.g., an image), choose between predicting by leveraging space correlation (i.e., neighboring portions of the same sample, e.g. intra-prediction in MPEG methods) or predicting by leveraging time correlation (i.e., portions of one or more reference samples, e.g., P-prediction or B-prediction in MPEG methods).

For the innovative embodiments described herein, space and time are not wholly independent dimensions to consider in isolation: space and time are just distinct dimensions of a broader multidimensional space called space-time. By representing a sequence of N-dimensional samples as a single (N+1)-dimensional signal, and by encoding said (N+1)-dimensional signal with a tiered hierarchical method, embodiments described herein can effectively encode-decode a signal in its space-time (through suitable space-time encoding-decoding operations), effectively leveraging at the same time space and time correlation (i.e., without having to choose between the two), and effectively leveraging correlation also across multiple samples (i.e., not just from one sample to another). In addition, by predicting samples based on samples of a lower level of quality (and/or higher level of aggregation) instead of based on neighboring samples at the same level of quality, lossy decisions taken in selected portions of the (N+1)-dimensional signal do not necessarily propagate themselves to other portions of the signal (i.e., to other samples/spans in the sequence). In short, embodiments described herein manipulate the signal in its entirety, leveraging correlation across the whole signal and considering the time dimension at the same level as the other dimensions. We often refer to this very innovative property of the methods described herein as "symmetry".

The invention relates to ways to encode, transmit and/or decode multiple original images based on common image element settings produced by analyzing the element settings across the multiple original images, said set of common image element settings being a baseline to substantially reproduce each of the original images in a sequence.

Instead of creating a "cascade of predictions" along images of a same sequence of images—like conventional methods—methods illustrated herein effectively blend the sequence of images into a same "common predictor" (which is—depending on the embodiment and/or on the purpose—either an image at a same resolution/level of quality as the original images or an image at a lower resolution/level of quality), and then produce sets of adjustment values such that a decoder can produce suitable renditions of the original images by combining said adjustment values with preliminary renditions based at least in part on said common predictor.

In some non-limiting embodiments described herein, common image elements settings (i.e., the "common predictor image") are produced by first performing image processing operations on each of the images in the sequence of images, so as to maximize the time correlation of the images blended into a common predictor. In some of such non-limiting embodiments, said image processing comprise motion-compensation operations according to suitable motion compensation methods.

In other non-limiting embodiments described herein, a decoder reconstructs a sequence of original images based on a single common predictor image, the method comprising:
receiving first encoded image data, the first encoded image data specifying a set of common image element settings (in one embodiment, a so-called common predictor image) to be used as a baseline for reproducing each of the multiple original images;
processing descriptive information, said descriptive information specifying how to reconstruct, based on the common predictor image, a preliminary image rendition for each of the original images in the sequence of original images;
receiving second encoded image data, the second encoded image data specifying adjustments (in one embodiment, so-called residual data) to be made to the preliminary image renditions;
substantially reproducing the multiple original images in the sequence by combining said adjustments with said preliminary image renditions.

These and other embodiment variations are discussed in more detail below.

Note that embodiments herein may be implemented in software or hardware, or may be implemented using a combination of software and hardware, and can include a configuration of one or more computerized devices, routers, network, workstations, handheld or laptop computers, tablets, mobile phones, game consoles, set-top boxes, etc., to carry out and/or support any or all of the method operations disclosed herein. In other words, one or more computerized devices or processors can be programmed and/or configured to operate as explained herein to carry out different embodiments.

In addition to the techniques as discussed above, yet other embodiments herein include software programs to perform the steps and operations summarized above and disclosed in detail below. One such embodiment comprises a computer-readable, hardware storage resource (i.e., a non-transitory computer readable media) including computer program logic, instructions, etc., encoded thereon that, when performed in a computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium (e.g., CD-ROM, DVD-ROM or BLU-RAY), flash memory card, floppy or hard disk or any other medium capable of storing computer readable instructions such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

One or more embodiments herein include a computer readable storage medium and/or system having instructions stored thereon. The instructions, when executed by computer processor hardware of one or more computer devices, causes the computer processor hardware to perform operations of: receiving image data specifying element settings for each image of multiple original images in a sequence; analyzing the element settings across the multiple original images; and utilizing the element settings of the multiple original images in the sequence to produce first encoded image data specifying a set of common image element settings, the set of common image element settings being a baseline to substantially reproduce each of the original images in the sequence.

One or more embodiments herein include a computer readable storage medium and/or system having instructions stored thereon. The instructions, when executed by computer processor hardware of one or more computer devices, causes the computer processor hardware to perform operations of: receiving a sequence of images; obtaining settings for each of the images; blending the settings across the sequence of images to produce a single image that is representative of the sequence of images; and for each given image in the sequence of images, producing data corresponding to image processing operations and/or adjustments specifying how to reconstruct, based on said predictor image, a rendition of the given image.

One or more embodiments herein include a computer readable storage medium and/or system having instructions stored thereon. The instructions, when executed by computer processor hardware of one or more computer devices, causes the computer processor hardware to perform operations of: receiving first encoded image data derived from multiple original images in a sequence, the first encoded image data specifying a set of common image element settings to be used as a baseline for reproducing each of the multiple original images in the sequence; receiving second encoded image data specifying adjustments; and substantially reproducing the multiple original images in the sequence based on application of the adjustments to preliminary renditions of the original images reconstructed based at least in part on the set of common image elements.

One or more embodiments herein include a computer readable storage medium and/or system having instructions stored thereon. The instructions, when executed by computer processor hardware of one or more computer devices, causes the computer processor hardware to perform operations of: receiving first image data derived from encoding a first grouping of images in a sequence; receiving second image data derived from encoding a second grouping of images in the sequence, the first grouping of image disposed adjacent to the second grouping of images in the sequence; and utilizing a combination of the first predictor image data and the second predictor image data to reconstruct a rendition of the first grouping of images in the sequence.

One particular embodiment of the present disclosure is directed to a computer program product that includes a computer-readable hardware storage medium having instructions stored thereon for supporting signal processing operations.

The ordering of the steps has been added for clarity sake. These steps can be performed in any suitable order.

Other embodiments of the present disclosure include software programs, firmware, and/or respective hardware to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software, firmware, and/or hardware, or as hardware alone such as within a processor, or within an operating system or within a software application, etc.

As discussed above, techniques herein are well suited for use in software, firmware, and/or hardware applications that process signals and produce bitstreams of encoded data, or that process bitstreams of encoded data and produce renditions of signals. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 1A is an example diagram illustrating a multiscale encoding and decoding system;

FIGS. 2A, 2B, 2C and 2D illustrate various steps of operations used to process two images;

DETAILED DESCRIPTION AND FURTHER SUMMARY OF EMBODIMENTS

Figure 1B:
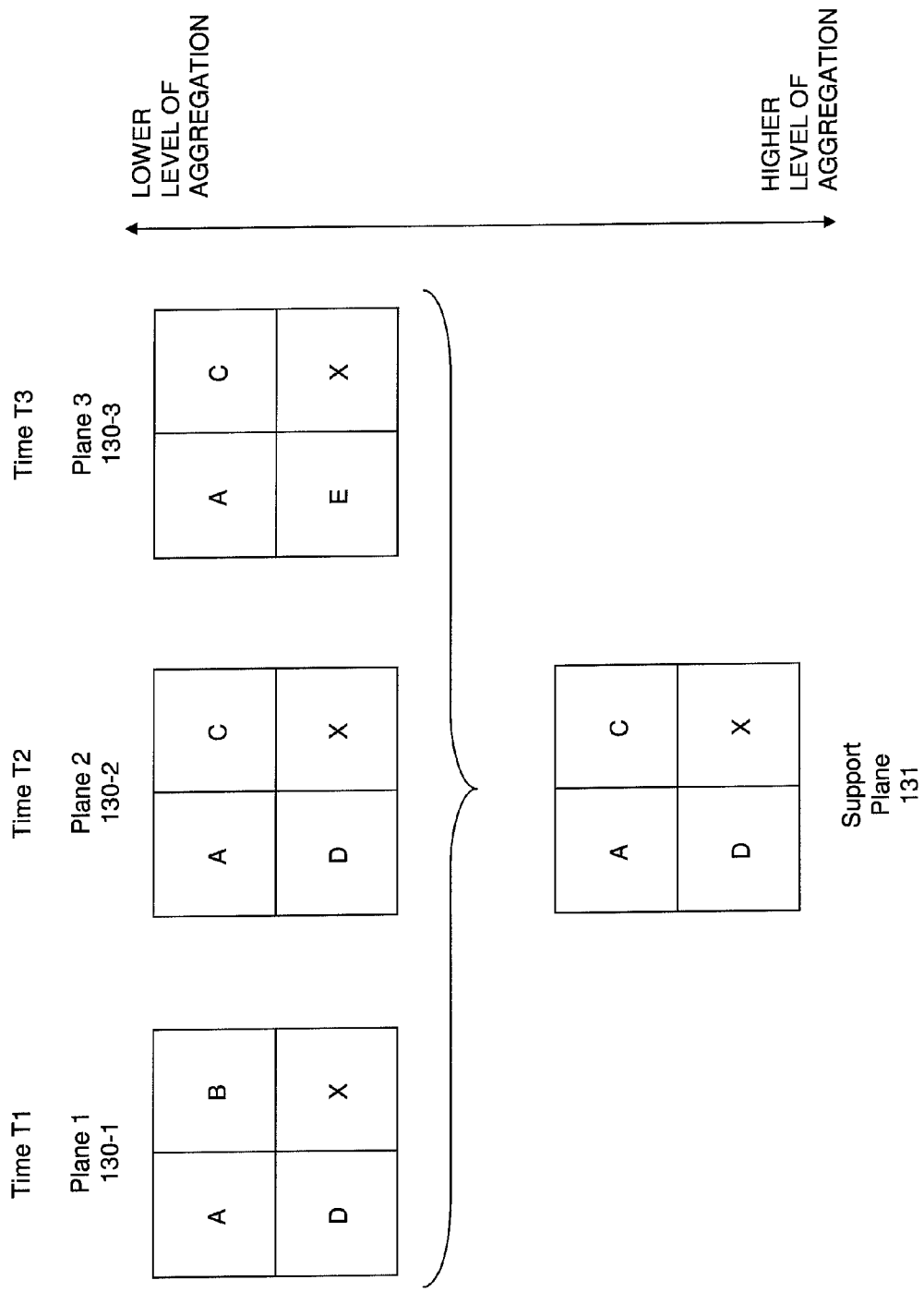
FIG. 1B is an example diagram illustrating an example of aggregation along the time dimension.

Methods illustrated herein are suitable for any type of multi-dimensional signals, including without limitation sound signals, multichannel sound signals, pictures, two-dimensional images, video signals, multi-view video signals, 3D video signals, volumetric signals, volumetric video signals, medical imaging signals, signals with more than four dimensions, etc. For simplicity, along the description the illustrated embodiments usually adopt the use case of video sequences, i.e., a time-based signal consisting of a sequence of 2D images (commonly called "frames", or "fields" in the case of interlaced video signals), with each element (in such non-limiting example case typically referred to as "pixel") being characterized by a set of color settings in a suitable color space (e.g., YUV, RGB, HSV, etc.). Different color planes (e.g., the luminance-Y plane and the two chrominance—U and V—planes) are often encoded separately, and often with different resolutions (due to the lower sensitivity of human eyes to chrominance information).

In other cases we will represent the signal as a sequence of N-dimensional samples or "spans" as defined before in this document, and refer to the fact that the full representation of the signal is an (N+1)-dimensional signal (e.g., if one of the dimensions is time, this corresponds to representing a sequence of spatial renditions with a single time-space rendition). These are to be considered non-limiting examples of the possible kinds of signals that can be filtered and/or compressed using innovative methods described herein. For signals other than videos, people skilled in the art can easily apply methods described herein by suitably adapting the approaches described for the use case of video signal. In a non-limiting example, spans can also be hyperplanes of elements with a different number of dimensions other than 2 (e.g., one-dimensional spans, three-dimensional spans, etc.) and/or it is possible to apply to dimensions different than time approaches that correspond to the ones described herein for the time dimension.

Every span in time of a signal is represented with a hyperplane (or more simply "plane", intended in its broadest meaning as "set of elements organized as an array with one or more dimensions"): for example a multichannel sound signal, a 2D HD video frame, or a 3D volumetric medical image can be all represented with arrays of plane elements (specifically, a 1D plane of elements for the multichannel sound signal, a 2D plane of elements for the HD video frame and a three-dimensional hyperplane of elements for the volumetric medical image). As already mentioned, without limitation in this application we will often refer to spans—broadly defined as detailed above—with the term "image".

Along time, spans occur at a given (local) sample rate. In conventional methods, the sample rate is always constant. On the contrary, innovative methods illustrated herein allow for a variable sample rate. In particular for levels of quality lower than the topmost level, the duration of spans of a given level of quality (i.e., the sample rate for that given level of quality) can be variable, effectively representing variable sample rates. In order to allow for suitable signal playback with spans that have different time durations, each span is also characterized by a "picture number", representing the time when the span should start being displayed.

Methods and embodiments illustrated herein can be used in conjunction with one another and/or with other methods. Many of the embodiments illustrated herein describe techniques and algorithms with the goal of achieving compression, i.e., encoding and/or decoding a suitable rendition of the signal with a minimum quantity of bits. This also is a non-limiting example: other embodiments can achieve different purposes, such as multiscale encoding and decoding, adaptive streaming, robust and efficient filtering, signal denoising (e.g., image denoising, video denoising, etc.), signal enhancements (e.g., signal supersampling, de-interlacing, etc.), generation of signal quality metrics, content identification, machine vision, signal encryption (e.g., secure communication), etc.

FIG. 1A is a non-limiting example diagram describing a multiscale encoding and decoding system according to embodiments herein.

In one embodiment, encoder 110 receives original signal 100 (such as a sequence of signals 100-1, 100-2, etc., and encodes the signal 100 into a multiscale data stream 115. Decoder 120-2 receives data stream 115 of encoded data and produces Reconstructed Signal at Lower LOQ 1001 such as a first level of quality.

Decoder 120-1 receives data stream 115 and produces Reconstructed Signal at Higher LOQ 1000 such as a second level of quality. In this example embodiment, the second level of quality is higher than the first level of quality. In one embodiment, the second (or higher) level of quality is a higher resolution image (e.g., more elements per unit area of display screen) than a resolution at the first (lower) level of quality. Thus, signal 1000-1 in the sequence is a higher resolution rendition of signal 1000-1, signal 1000-2 in the sequence is a higher resolution rendition of signal 1000-2, and so on.

In a non-limiting embodiment, also Decoder 120-1 produces Reconstructed Signal at Lower LOQ 1001 in order to reconstruct, based on Reconstructed Signal at Lower LOQ 1001, Reconstructed Signal at Higher LOQ 1000.

In some non-limiting embodiments, as mentioned, the second level of quality has a higher resolution (spatial and/or temporal) than the first. In some of such embodiments, the second level of quality has a resolution obtained by upsampling with a specific scale factor (including non-integer scale factors and/or scale factors equal to 1) each of the dimensions of the signal. In other words, signal 1000-1 can be upsampled based at least in part from signal 1001-1; signal 1000-2 can be upsampled based at least in part from signal 1001-2; and so on. In a similar manner, each signal in the signal 1001 can be upsampled to a signal at a higher resolution.

In another non-limiting embodiment, Decoder 120-2 leverages legacy decoding techniques (e.g., MPEG2, h.264, etc.) in order to decode data stream 115.

In a non-limiting example embodiment, a decoding signal processor of a TV decoder (e.g., without limitation, a set top box) is programmed so as to implement a method as illustrated in FIG. 1A, wherein Data Stream 115 corresponds to the received broadcast signal. In this way, legacy decoders receive the same Data Stream 115 as decoder 120, but just ignore the additional data in the data stream that is available to reconstruct a rendition of the signal at the higher level of quality.

In other non-limiting embodiments, a streaming server processes encoded data stream 115 and, in response to characteristics of the decoder and/or to bandwidth congestion, generates a version of the data stream that only includes the encoded data necessary to decode the signal up to a given level of quality (as opposed to the maximum possible level of quality).

FIG. 1B is a diagram illustrating a non-limiting example of aggregation along a temporal dimension according to embodiments herein.

By way of a non-limiting example, the three planes 130-1, 130-2, 130-3, each include four elements organized as a 2×2 plane, are aggregated into Support Plane 131, with the same resolution as the original planes. Each plane can include any number of elements.

In one embodiment, elements of Support Plane 131 are calculated based on corresponding elements of Planes 130-1, 130-2 and 130-3. The number of planes aggregated into a same Support Plane should be considered as non-limiting, since in principle any number of planes can be aggregated into a single support plane. In this non-limiting example embodiment, support Plane 131 is said to be at a "higher level of aggregation" (LOA) than Planes 130-1, 130-2 and 130-3.

In some non-limiting embodiments, Support Plane 131 is processed in order to reconstruct, based on specific reconstruction data for each of Planes 130-1, 130-2 and 130-3, renditions of Plane 130-1, 130-2 and 130-3.

In other non-limiting embodiments, Planes 130-1, 130-2 and 130-3 are residual planes, specifying adjustments to be made to preliminary renditions of corresponding samples in order to produce a reconstructed rendition of a signal. In other words, the planes such as plane 130-1, plane 130-2, plane 130-3, etc., can represent so-called residual data. The residual data can be adjustment data specifying how to adjustment each of multiple elements in a signal being reconstructed so that the reconstructed signal more closely matches an original rendition of the signal.

In the non-limiting embodiment of FIG. 1B, each plane of information corresponds to a different sampling position (i.e., sample time). For example, plane 130-1 of elements can represent adjustment information associated with recreating a rendition of an original signal captured at time T1 in the sequence; plane 130-2 of elements can represent adjustment information associated with recreating a rendition of an original signal captured at time T2 in the sequence; plane 130-3 of elements can represent adjustment information associated with recreating a rendition of an original signal captured at time T3 in the sequence; and so on.

In other non-limiting embodiments, Planes 130-1, 130-2 and 130-3 are support planes for other planes at a lower level of aggregation. As an example, multiple planes at a lower level of aggregation can be aggregated to produce plane 130-1; multiple planes at a lower level of aggregation can be aggregated to produce plane 130-2; multiple planes at a lower level of aggregation can be aggregated to produce plane 130-3; and so on. Accordingly, adjustment information associated with multiple planes (images) can be combined in a hierarchical manner into a single support plane.

As shown, the single support plane 131 of elements captures attributes of each of multiple temporal planes of elements. For example, in this simple example without motion compensation, the lower left element in the plane 131 is set to a value of D since this is the predominant setting of corresponding elements (e.g., bottom left elements) in the planes 130-1, 130-2, 130-3, and so on.

The upper right element in the plane 131 is set to a value of C since this is the predominant setting of the corresponding elements (e.g., top right element) in the planes 130-1, 130-2, 130-3, and so on. Accordingly, support plane 131 includes a blend of multiple individual image planes.

In other non-limiting embodiments, corresponding elements of different planes may reside in different locations of their respective planes (as specified by suitable descriptive information on motion), in order to account for motion of objects over time. Embodiments herein can include generating reconstruction data (such as residual data) to convert the support plane 131 back into the individual planes 130-1, plane 130-2, plane 130-3, and so on. For example, an encoder compares settings of elements in support plane 131 to settings of elements in original plane 130-1. In this example, reconstruction data for the plane 130-1 would indicate that support plane 131 can be converted into plane 130-1 with an adjustment to the upper right element in the support plane 131. That is, the settings in plane 130-1 are generally the same as settings of elements in the support plane 131 except that the upper left element. The reconstruction data associated with plane 130-1 can include difference information applied to the setting value C to change it to the value B for the upper right display element in plane 130-1. Further in this example embodiment, an encoder compares settings of elements in support plane 131 to settings of elements in original plane 130-2. In this example, reconstruction data for the plane 130-2 would indicate that settings in support plane 131 can be converted into elements of plane 130-2 without any adjustments.

Further in this example, an encoder compares settings of elements in support plane 131 to settings of elements in original plane 130-3. In this example, reconstruction data for the plane 130-3 would indicate that support plane 131 can be converted into plane 130-3 with an adjustment to the lower left element in the support plane 131. That is, the settings in plane 130-3 are generally the same as settings of elements in the support plane 131 except that the upper left element are different. The reconstruction data associated with plane 130-3 can include difference information applied to the setting value D in the support plane 131 to change it to the value E for the lower left display element when reconstructing settings for plane 130-3.

Figure 1C:
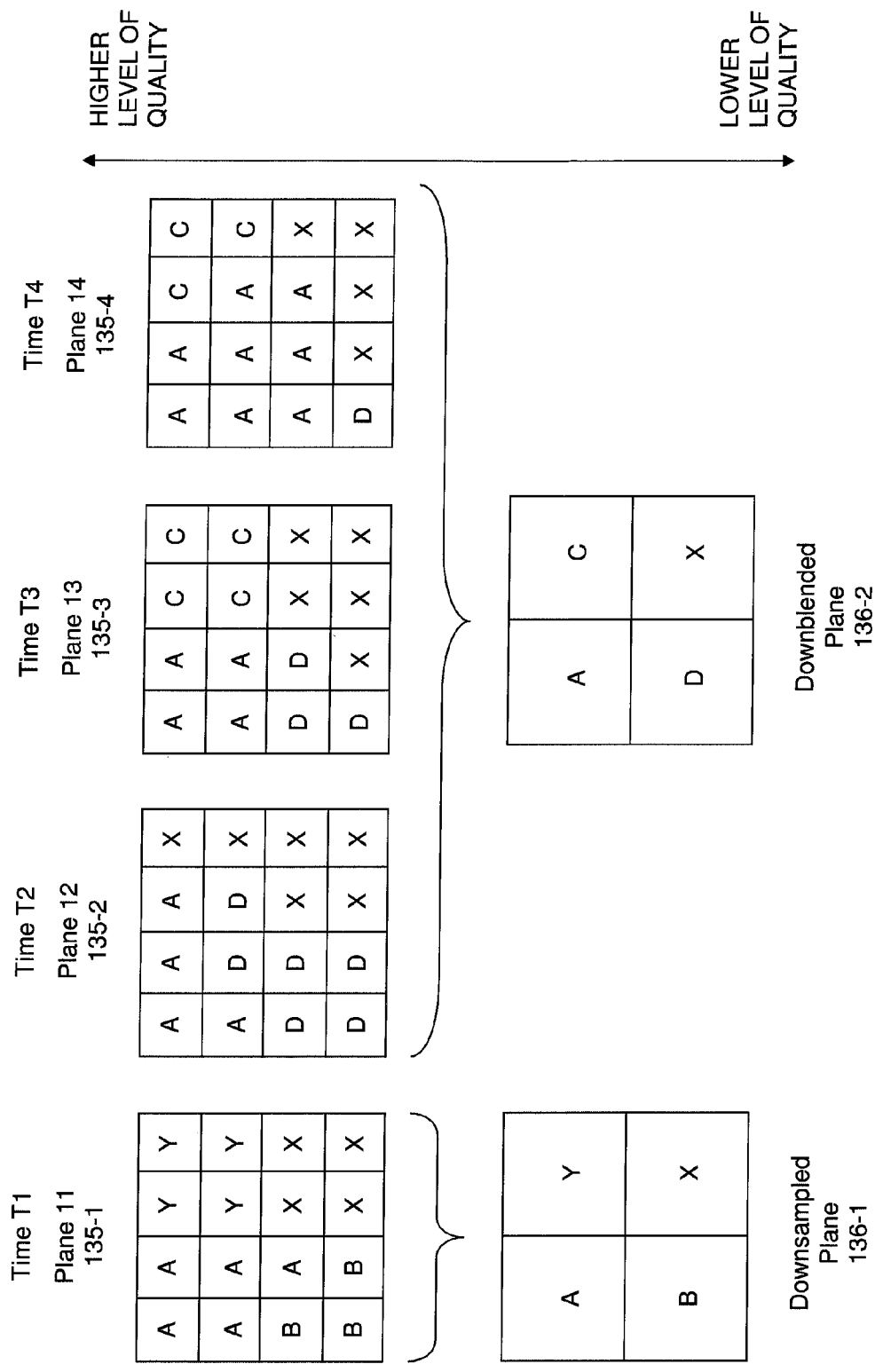
FIG. 1C is an example diagram illustrating examples of spatial downsampling and space-time downblending.

FIG. 1C is an example diagram illustrating non-limiting examples of spatial downsampling and space-time downblending according to embodiments herein. The diagram illustrates a sequence of planes at a first (higher) level of quality) and a corresponding sequence of planes at a second level of quality, the second level of quality being lower than the first.

In particular, the sequence at the second level of quality has been obtained as follows:

Plane 11 135-1, a two-dimensional plane made of sixteen elements, is downsampled with a scale factor of two along both of its spatial dimensions, producing Downsampled Plane 136-1; Planes 135-2, 135-3 and 135-4, three two-dimensional planes each made of sixteen elements, are downsampled with a scale factor of two along their spatial dimensions and with a scale factor of three along the time dimension, producing Downblended Plane 136-2. Assume in this example that plane 135-1 is a representation of a sample image at time T1; plane 135-2 is a representation of a sample image at time T2; plane 135-3 is a representation of a sample image at time T3; plane 135-4 is a representation of a sample image at time T4; and so on.

The operation of space-time downsampling (i.e., downsampling also along the time dimension) is also referred to in this application as "downblending" (shorthand for "downsampling+time blending"). In one embodiment, downsampling refers to reducing the resolution of the rendition of the signal down the level of quality hierarchy; blending refers to combining attributes of sample signals sampled over time. The number of planes downblended into a same Downblended Plane should be considered as non-limiting, since in principle any number of planes can be downblended into a downblended plane.

Embodiments herein can include generating reconstruction data (such as residual data) to convert the support plane 136 back into the individual planes 135-2, plane 135-3, and plane 135-4. For example, an encoder can be configured to determine modifications that need to be done after upsampling the plane 136-2 into a preliminary rendition of the signal at a same level of quality as planes 135-2, 135-3, and 135-4. The encoder then produces a first set of reconstruction data indicating how to modify elements in the upsampled rendition of the plane 136-2 into the plane 135-2; the encoder then produces a second set of reconstruction data indicating how to modify elements in the upsampled rendition of the plane 136-2 into the plane 135-3; the encoder then produces a third set of reconstruction data indicating how to modify elements in the upsampled rendition of the plane 136-2 into the plane 135-4. Accordingly, a decoder can receive reconstruction data associated with plane 136-2 and the first set of reconstruction data to reproduce settings in plane 135-2; the decoder can receive reconstruction data associated with plane 136-2 and the second set of reconstruction data to reproduce settings in plane 135-3; the decoder can receive reconstruction data associated with plane 136-2 and the third set of reconstruction data to reproduce settings in plane 135-4.

Figure 1D:
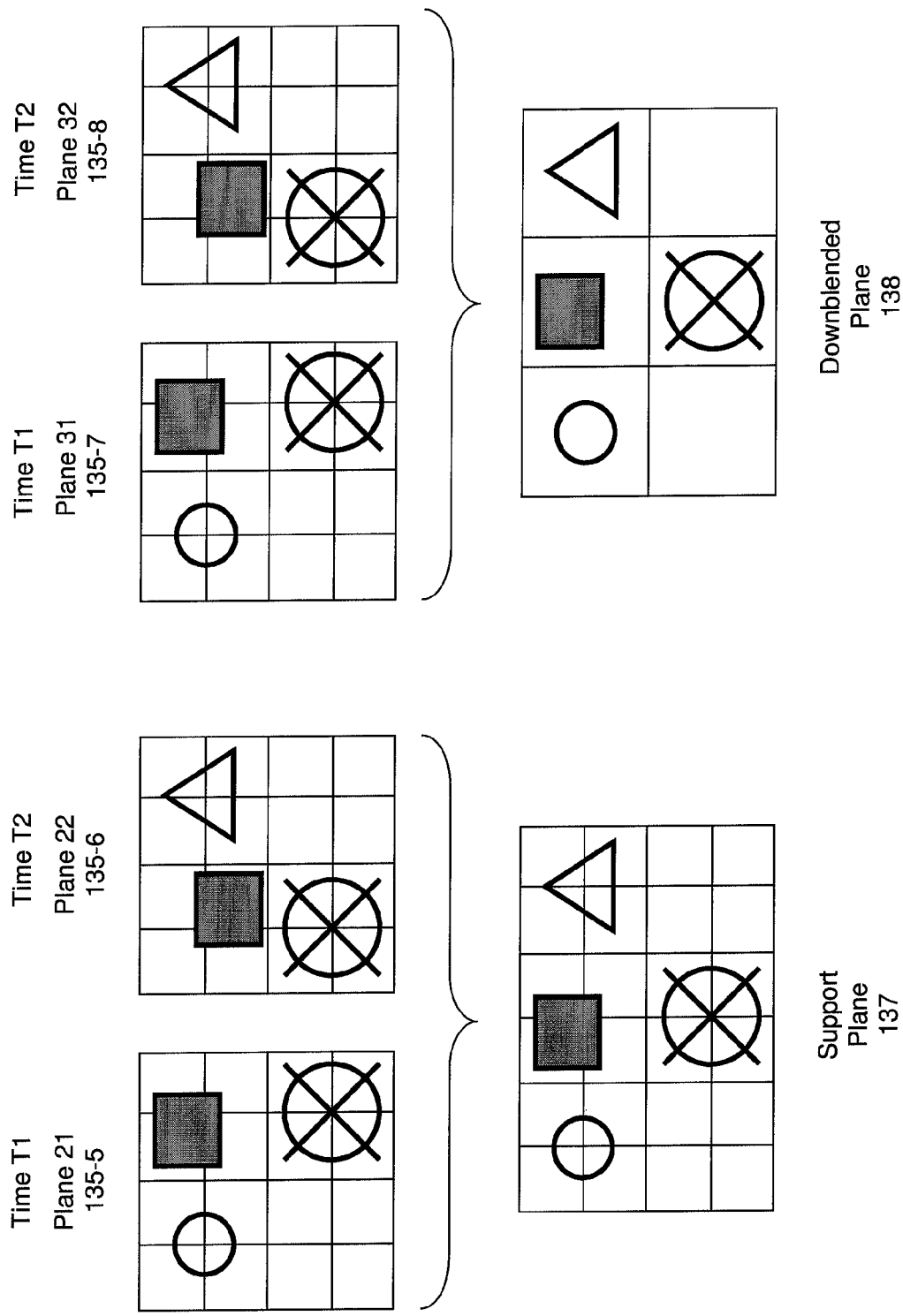
FIG. 1D is an example diagram illustrating examples of aggregation along time and space-time downblending.

FIG. 1D is an example diagram illustrating non-limiting examples of aggregation and space-time downblending performed together with motion compensation according to embodiments herein.

Plane 21 135-5 and Plane 22 135-6 are aggregated into Support Plane 137, wherein Support Plane 137 has a higher number of elements than the original planes. Elements of Support Plane 137 are calculated based on corresponding elements of Planes 135-5 and 135-6. In this non-limiting example embodiment, it can be noted that Support Plane 137 doesn't have a sampling grid with a higher resolution than that of the original planes. It is an enlarged sampling region (e.g., greater number of display elements than in the original planes 135-5, 135-6, etc.). The grid in plane 137 is extended with respect to planes 21, 22, 31, 32, to capture a larger portion of the "scene" (i.e., with a larger "field of view"). Enlarging the region of display elements associated with support plane 137 allows capturing a larger portion of the display elements in planes 21 and 22 into Support Plane 137. Accordingly, support plane 137 includes an aggregation of information from multiple planes. For example, as shown, support plane 137 includes a combination of objects presented in each of planes 21 and 22.

As shown, Support Plane 137 includes a rendition of a first object (e.g., the information visually illustrated as a dark square present in both planes 21 and 22) as well as a second object (e.g., the information visually illustrated as a triangle in only plane 22). The figure shows the effects of motion compensation, wherein the information visually illustrated as a dark square, which is changing location along time, is motion compensated before being blended into Support Plane 137. In particular, the figure shows an example of motion compensation with respect to the sampling position of plane 21 (i.e., in Support Plane 137, the dark square is located in the position that it had in plane 21). In other words, in one embodiment, due to motion compensation, the blended plane 137 is not obtained by means of just a simple overlay of the multiple original planes, but it is a weighted average of "warped" planes, each of the warped planes obtained by motion compensating a given original plane with respect to the sampling position of Support Plane 137.

As an example, a rendition of the same object can be present in two different planes. Embodiments herein can include producing motion compensation information such as a specific motion correlating display elements of the object in a second plane to elements of the same object in the first plane. Embodiments herein can include applying the generated motion matrix to the object in the second plane to produce the so-called warped rendition of the second plane's object. The rendition of the second plane's object (motion adjusted) can then be combined with settings of the object on the first plane to produce a rendition of the object in the support plane.

In this example embodiment, Plane 31 135-7 and Plane 32 135-8 are downblended into Downblended Plane 138, wherein Downblended Plane 138 has more elements than the sampling grid resulting from spatial downsampling operations. Like Support Plane 137, also Downblended Plane 138 comprises information that is partly represented in all of the planes downblended into it, and partly represented only in some of the planes. In this manner, embodiments herein include applying a downsample algorithm to reduce a resolution of representative plane as well as enlarging a region (e.g., number of display elements) of coverage associated with the downsampled plane in order to accommodate capturing a rendition of objects present in multiple different planes.

Accordingly, a sequence of images (and captured moving objects) associated with a video can be captured in a single image of same or different resolution than the original images.

In one embodiment, encoder processor hardware produces the support plane 137 to include set of common image element settings amongst the plane 21 and 22. The support plane 137 can be configured to include: i) a rendition of a first object (small circle) as detected in a first plane (image) of the multiple original images, and ii) a rendition of a second object (triangle) as detected in a second plane (image) of the multiple original images. The rendition of the second object (triangle) can be absent from the first pane 21. The rendition of the first object (small circle) can be absent from the second plane 22.

FIGS. 2A, 2B, 2C and 2D are example diagrams illustrating different non-limiting embodiments implementing the combination (i.e., according to what illustrated in FIGS. 1B, 1C and 1D, either aggregation or downblending) of two bidimensional planes of elements. For simplicity, all of the four figures visually illustrate just downsampling in the time domain, while in fact they show downblending of two spans 100-1 and 100-2 of a higher LOQ into a single span of a lower LOQ. The same considerations illustrated for downblending, however, are also valid for aggregation within a same LOQ.

The four FIGS. 2A, 2B, 2C and 2D, focusing on the example case of downblending span 100-1 and 100-2 so as to generate a downsampled span of LOQ #−1 (e.g., 101-1), also illustrate the effects of applying different motion compensation approaches (and in particular, also the novel methods that, for lack of literature, we defined as "non-symmetric balanced motion compensation"). Mathematically, all of the three example embodiments apply the following formula, although with different motion compensation operations:

$$X_1^{-1}(t)=\text{Down}(0.5 \cdot \text{MC}(X_1^0(1))+0.5 \cdot \text{MC}(X_1^0(2)))$$

wherein $X_L^K$ (t) identifies a span of LOT L, LOQ K and sampling position t, Down(•) identifies a spatial downsampling operation, and MC(•) identifies a motion compensation operation with reference to sampling position t. In the above equation, due to the fact that in this non-limiting embodiment spans of LOQ 0 have constant time span, time blending is performed with balanced weights, each of the weights being equal to 0.5.

Motion compensation operations are performed relatively to the sampling position of the downblended span. If descriptive information on motion is encoded in a suitable format (e.g., our novel methods of floating point motion compensation with arbitrarily-defined motion zones and motion matrixes, further described in patent applications), motion compensation operations relatively to different sampling positions can be expressed and calculated in a very efficient way.

In a set of non-limiting embodiments described herein, for portions of the signal that are assigned descriptive information on motion, motion is estimated with a plurality of parameters and is calculated as "balanced motion" (or "bidirectional motion"): essentially, instead of specifying movements from one span with respect to another, it specifies the motion from both spans with respect to a common reference position, in order to enable bidirectional decoding. Some of such embodiments represent motion by using one or more motion matrixes (e.g., as opposed to the conventional methods of using motion vectors indicating only translation movements, i.e., offsets). The use of motion matrixes (i.e., encoding more than two parameters in order to represent a specific motion) is a novel and key characteristic of such non-limiting methods, enabling estimation and compensation of more sophisticated movements like zoom, rotations, perspective changes, etc. A motion matrix is at times collapsed into a simple offset vector in embodiments where a translation movement is considered sufficient (for example due to known sampling constraints or to complexity constraints). In other non-limiting embodiments, movement is represented by one or more motion matrixes corresponding to affine transforms, with motion compensated coordinates being calculated by using homogeneous coordinates methods. Each of the motion matrixes is assigned to a specific and arbitrarily defined portion of the signal, which we define as "motion zone". In other non-limiting embodiments, motion matrixes correspond to more generic perspective transformations, allowing describing even more complex sets of movements.

Motion matrixes (and, for embodiments that use them, motion zones of arbitrary size and shape) are transmitted to the decoder, and have several advantages: for instance, they can be reversed, and motion of a same motion zone across a number of sampling positions can be calculated by suitably combining (e.g., multiplying) the motion matrixes corresponding to each temporal step. Having said that, motion matrixes and motion zones are just one of many non-limiting embodiments of motion estimation and compensation, and methods described herein can suitably work with substantially any type of motion estimation and compensation method.

Figure 2A:
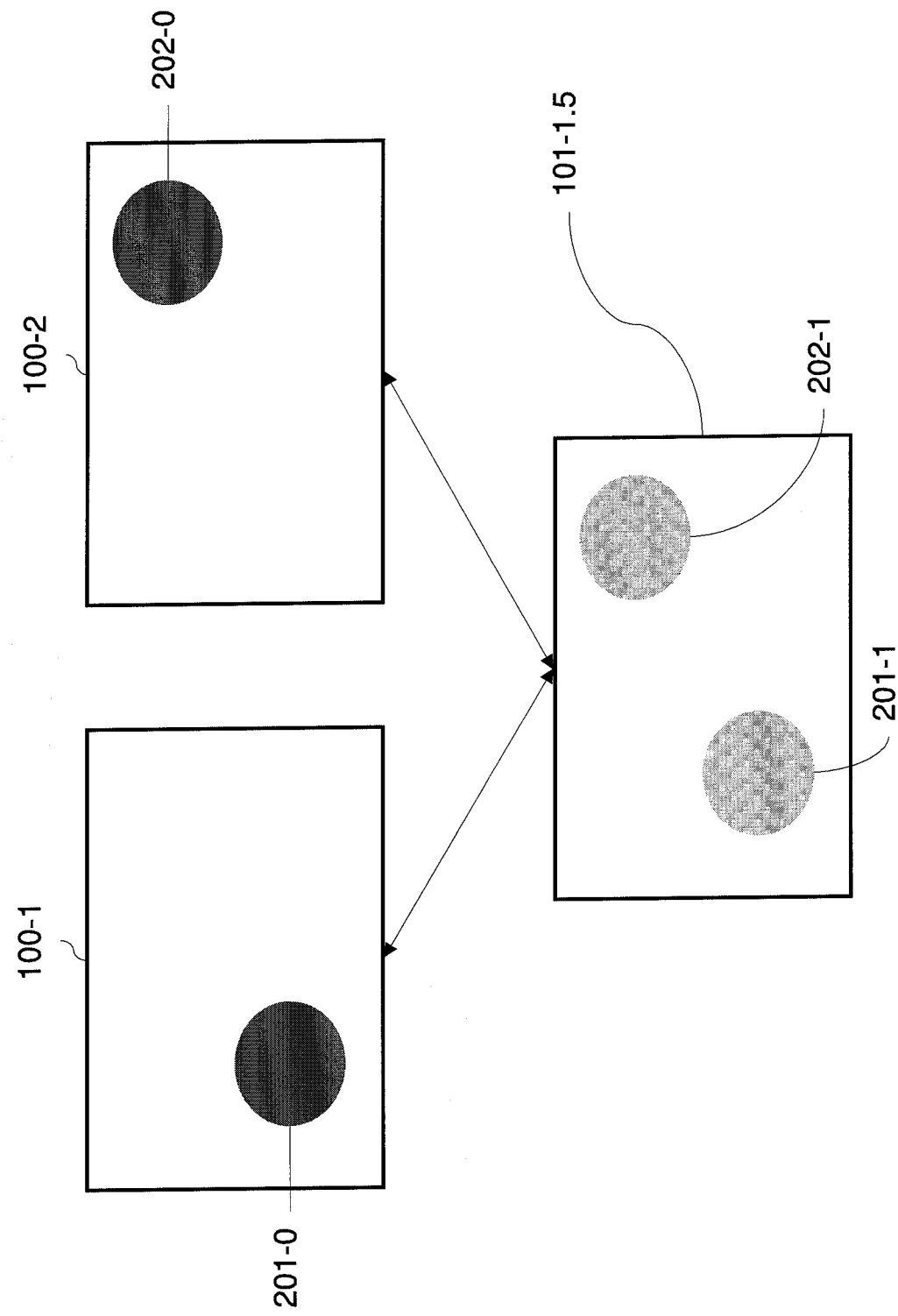

FIG. 2A illustrates the effect of applying no motion compensation (or, equivalently, motion compensating by means of a constant identity function), and consequently also of applying no "framing".

Span 100-1, sampled at t=1, and span 100-2, sampled at t=2, are merged into span 101-1.5, sampled at t=(1+2)/2=1.5. The fact that the sampling position of downblended span 101-1.5 is the average of the original sampling positions of the spans 100-1 and 100-2 is evident from the illustration. A solid circular object 201-0 is moving from the bottom left of the image (span 100-1, sampling position 1) to the top right of the image (object 202-0 of span 100-2, sampling position 2). A linear downsampling by a factor of 2 (e.g., a trilinear downblending) of spans 100-1 and 100-2 produces span 101-1.5, wherein horizontal and vertical dimensions are halved and the solid circular object appears as partially transparent and visible in both span positions: essentially, by looking at this span, an observer is looking at the entire motion of the object between sampling positions 1 and 2, essentially being positioned (from a temporal point of view) in between the two extremes. This simple three-dimensional (i.e., space-time) downsampling approach is used in a non-limiting embodiment wherein the speed of visible objects is below a predetermined threshold (i.e., temporal correlation is extremely high) and in conditions wherein a degree of motion blur in reconstructed renditions is acceptable. A non-limiting practical example is a video of a slow-moving scene shot at very high resolution and 1,000 frames per second.

In other embodiments, motion estimation and compensation is useful in order to perform N-dimensional downsampling.

When motion compensation is performed, spatial downsampling and temporal downsampling ("blending") can be performed either separately, or jointly, with several possible combinations. In a non-limiting example embodiment, spans are motion compensated and then three-dimensional downsampling is applied. In another non-limiting embodiment, spatial downsampling is performed, followed by motion compensation and lastly by temporal downsampling. In another non-limiting embodiment, spatial downsampling is combined with motion compensation, and followed by temporal downsampling.

Figure 2B:
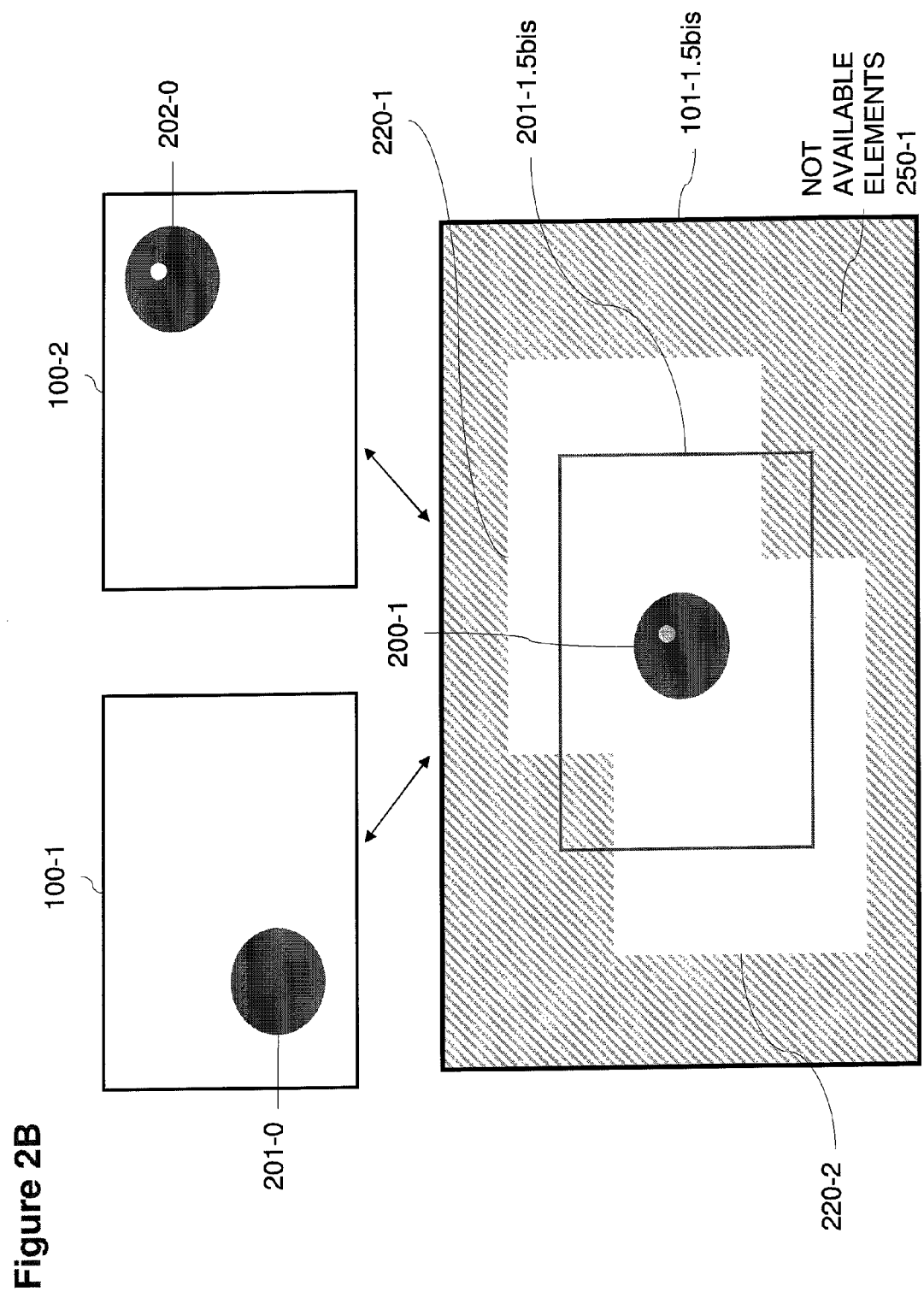

FIG. 2B is an example diagram illustrating a non-limiting example of balanced motion compensation.

A non-limiting example embodiment determines the motion of objects and estimates their positions at a span time intermediate with respect to the sampling positions of the two original spans. In order to maintain symmetry, motion compensation is performed in a balanced way, so as reposition the two spans in a highly correlated intermediate position (essentially corresponding to sampling a position which is in the middle position—i.e., sampling position 1.5—with respect to position 1 and position 2 of the two original spans) before "merging" them together with the temporal downsampling operation. The object 200-1 is located in an average location of the location of object 201-0 in span 100-1 and the location of object 202-0 in span 100-2.

In this simple case, the object is moving with a simple translational motion (i.e., an offset). The descriptive information on movement for the object to be used in the two motion compensation operations is thus characterized by a single vector, since the other vector is calculated as the "complement vector".

The benefit of such balanced approach is to avoid any choice of a reference image and/or of a preferential direction for movements. Motion information structured in this way can be used to estimate the movement of the object in whichever time direction the playback is moving, essentially enabling bidirectional playback (a feature never offered so far by encoding techniques based on motion estimation and compensation).

In order to suitably perform motion compensation operations, a destination plane of elements 201-1.5bis is produced, corresponding to the image that would be sent to a display device if the downsampled span 101-1.5bis had to be displayed. At the same time, it is clear from FIG. 2B that span 101-1.5bis benefits from the allocation of a plane of elements larger than just the destination plane 201-1.5bis, in order to include also elements that, despite being outside of the destination plane, could be useful (in particular after additional and/or inverse motion compensation operations) in order to generate predictions for spans 100-1 and 100-2, as well as during additional downsampling operations.

Due to lack of literature, we created the new term "framing" to define the additional rows and columns of span 101-1.5bis with respect to destination plane 201-1.5bis.

Span 101-1.5bis is thus the combination of planes 220-1 (representing span 100-1 in its shifted position) and 220-2 (representing span 100-2 in its shifted position). As it is evident from FIG. 2B, span 101-1.5bis contains plane elements having very different levels of importance. Elements belonging to areas 220-1 and 220-2 are "valid" plane elements, containing relevant information. All the other elements (illustrated in the diagram by the areas with diagonal lines) are null elements, or "Not Available" elements (250-1). They are not transmitted to the decoder (in a compression-oriented embodiment), and the decoder knows precisely the position and the size of areas 220-1 and 220-2, with the same precision as motion information is known. In this example, "Not Available" elements are not to be averaged with elements that have a "valid" value. In all of the operations (either during downsampling or during upsampling) that involve a weighted average of a set of elements that include "Not Available" elements, "Not Available" elements are eliminated from the weighted average, and the weights for the remaining elements are normalized so as their sum is equal to 1 (in the illustrated non-limiting embodiment, this is achieved by adding a same constant to all of the remaining weights).

Elements that have a value but are outside of the destination plane 201-1.5bis would not be shown if the span had to be displayed, but are still useful: e.g., to support upsampling operations during the decoding process, as well as to support further downsampling operations during the encoding process.

In the non-limiting embodiment, the amount of framing relatively to the size of the destination plane increases at every successively lower LOQ, corresponding to the fact that spans of a lower LOQ are the results of a higher number of motion-compensated spans (i.e., encompass a larger amount of time), and thus must allow for a higher degree of movement.

Figure 2C:
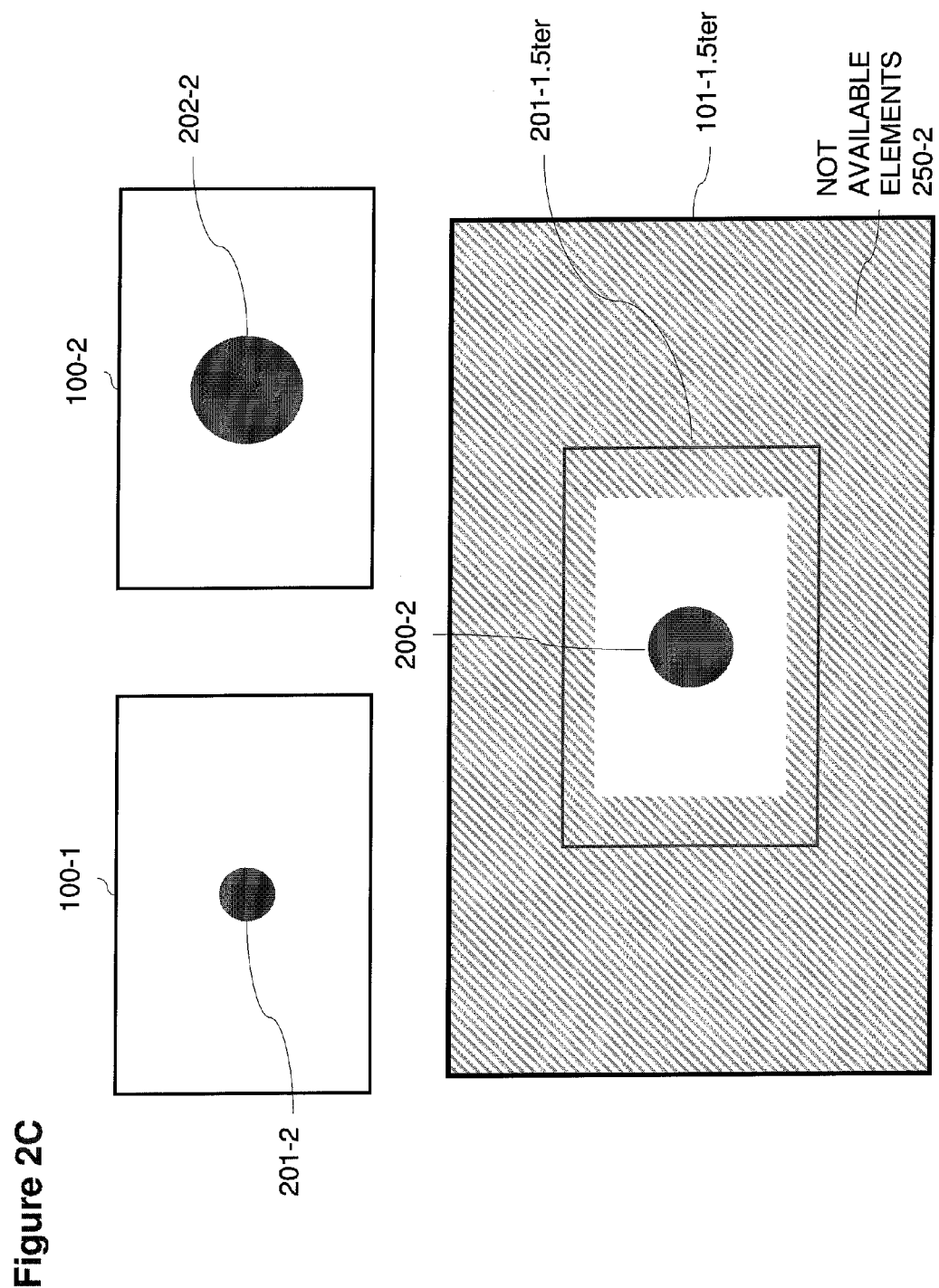

FIG. 2C illustrates one more example case of temporal downsampling with balanced motion compensation, this time introducing a more sophisticated type of movement (specifically, a scale transformation, i.e. a zoom). The previous case illustrated motion information including offset information (which is the information typically represented by state of the art motion estimation and compensation methods). Non-limiting embodiments illustrated herein leverage balanced motion estimation and compensation methods while at the same time representing also more sophisticated types of motion, including without limitation offsets, rotations, zoom/divergence, perspective changes, etc. In particular, the non-limiting embodiment illustrated herein represents movement with an affine (or "ZRO") motion matrix, identified by four ZRO parameters (one parameter for Zoom, one parameter for Rotation and two parameters for Offset).

Similarly to what we described in FIG. 2B, also in FIG. 2C the resulting downsampled span in centered at sampling position 1.5.

Both FIG. 2B and FIG. 2C, despite showing the benefits of balanced motion compensation, also show quite clearly the limits of centering downsampled spans at intermediate (i.e., potentially non integer) sampling positions. Although it is theoretically elegant to center a downsampled span in between its corresponding spans at the higher level of quality, fractional sampling positions generate problems whereby it becomes necessary to display the signal at a level of quality lower than the topmost LOQ. First of all, dynamically switching from the topmost level of quality (with its original sample rate) to a lower level of quality (with fractionary sample rates), would engender perceived "judders" and "stutters" in the motion of objects. Secondly, as it is evident from FIG. 2B and FIG. 2C, the destination plane of the resulting span (i.e., the image to display if the span had to be displayed) would be in an intermediate position between the two original spans, and consequently it would feature visible "Not Available" areas, very likely unpleasant to watch at least as much as the judders mentioned above. A non-limiting embodiment solves such problems by applying symmetric temporal downsampling only on groups with an odd number of spans (so that the intermediate sampling position is an integer sampling position, and the destination plane is centered on the intermediate span of said odd group of spans). Another non-limiting embodiment that solves such problems while still allowing to downsample even numbers of spans is illustrated by FIG. 2D.

FIG. 2D illustrates—for the same source signal as in FIG. 2B—a non-limiting example embodiment of "balanced non-symmetric motion compensation", achieving all of the benefits of balanced motion compensation without the above mentioned limitations of intermediate (symmetric) sampling positions.

Spans 100-1 and 100-2 are still motion compensated according to invertible motion transforms (in the specific non-limiting embodiment, suitable ZRO motion matrixes for each relevant motion zone), but this time with respect to a sampling position equal to 1, instead of 1.5. It is thus still true that motion compensation information for span 100-1 is directly computable from motion compensation information for span 100-2, or vice versa: motion compensation is indeed still "balanced", i.e., bidirectional.

At the same time, downsampled span 101-1 is characterized by a destination plane 201-1 that is essentially the same as span 100-1 (with the possible addition of some information coming from span 100-2 but positioned consistently with span 100-1). As a consequence, if span 101-1 had to be displayed, there would not be any "Not Available" areas, and also in terms of sample rate, despite a certain "blending" effect, there would not be perceived judders in the movements of objects.

Figure 3:
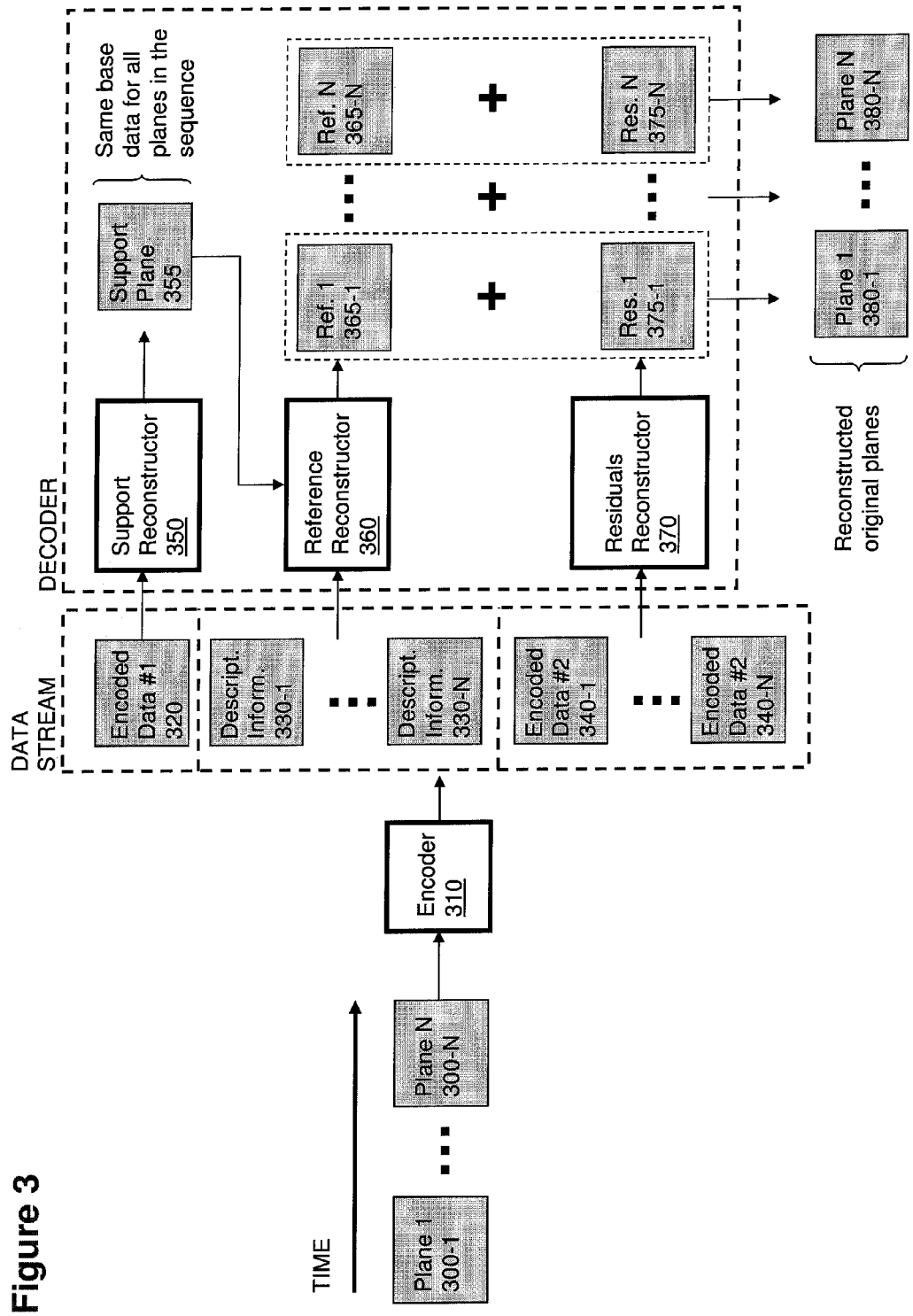
FIG. 3 is an example diagram illustrating encoding based on a common blended predictor.

FIG. 3 is an example diagram illustrating a non-limiting embodiment implementing encoding a sequence of multidimensional planes of elements based on a common blended predictor (herein called "support plane").

Planes 300-1, . . . , 300-N are processed by encoder 310, which produces a stream of encoded data. In particular, said stream of encoded data comprises Encoded Data #1 320, sets of Descriptive Information 330-1, . . . , 330-N and sets of Encoded Data #2 340-1, . . . , 340-N.

Encoded Data #1 320 is received and processed by Support Reconstructor 350, which produces Support Plane 355.

Support Plane 355 is leveraged by the decoder as a baseline to reconstruct suitable renditions corresponding to original planes 300-1, . . . , 300-N. In particular, Support Plane 355 is processed by Reference Reconstructor 360, which produces Reference planes 365-1, . . . , 365-N, each obtained by processing Support Plane 355 based on a corresponding set of Descriptive Information 330-i. In a non-limiting embodiment, image processing operations to produce each of the Reference planes 365-i comprise motion compensation operations on Support Plane 355 based on motion information corresponding to set of Descriptive Information 330-i.

Residuals Reconstructor 370 receives and processes sets of Encoded Data #2 340-1, . . . , 340-N, producing sets of Residuals 375-1, . . . , 375-N.

The decoder then produces reconstructed planes 380-1, . . . , 380-N by combining Reference planes 365-1, . . . , 365-N with Residual planes 375-1, . . . , 375-N.

We call the set of elements 355 a "Support Plane" for a given sequence of planes at a given level of quality because it "supports" the reconstruction of all of the planes in the sequence. Essentially, it supports the reduction of information entropy (e.g., of the encoded amount in bits) of the reconstruction data necessary to reconstruct said sequence, by exploiting the time correlation of the planes across the sequence. By concentrating time-correlated element settings in a single "superset of settings" (i.e., intuitively, by avoiding to repeat a same information multiple times for subsequent planes, while at the same time avoiding to predict each plane from a previous one, which would generate accumulation of errors), the support plane maximizes the number of residuals that after quantization are substantially equal to zero, consequently reducing a metric corresponding to the overall information entropy of residual data.

Other non-limiting embodiments also adopt what we defined as "multipredictive encoding" method, because the reconstructed rendition for a given image is obtained by combining residuals with two predictions: a first prediction generated based on a rendition of the signal at a lower level of quality and a second prediction based on motion-compensation of a support plane at the same level of quality.

As explained above, conventional methods (e.g. in the case of video signals, MPEG-based technologies, VP8, etc.) exploit time correlation by encoding/decoding the differences vs. a precedent or subsequent sample (hence generating a "temporal cascade" of samples encoded with respect to one another, with accumulation of errors over time and essentially mono-directional reconstruction/playback). The methods described herein of "temporal downsampling" and "temporal aggregation"—including without limitation all of the methods illustrated so far—consist of encoding/decoding temporally blended information (subsampled in the case of tiered temporal hierarchies; at the same resolution or even at higher resolutions in the case of support planes) that serve as common predictors and substantially summarize correlated information of a plurality of images, allowing (1) to leverage time correlation across longer sequences of images (due to absence of accumulation of errors), (2) to perform bidirectional reconstruction/playback and (3) to perform also random access reconstruction of any image in a sequence. As a non-limiting example, a decision to heavily quantize the residuals that allow to reconstruct a given image (i.e., a decision that creates significant loss of information and/or artefacts in one image) has no impact on the other images at the same LOQ that are reconstructed based on a same support plane and on a same set of predictors at a lower LOQ. Also, decoding can be performed in reverse temporal order (e.g., smooth reverse playing of a video, as opposed to current methods of just skipping from an I-frame to a previous I-frame), since reconstruction of any one image does not require the availability of a reconstructed rendition of a previous image in the temporal order.

Figure 4A:
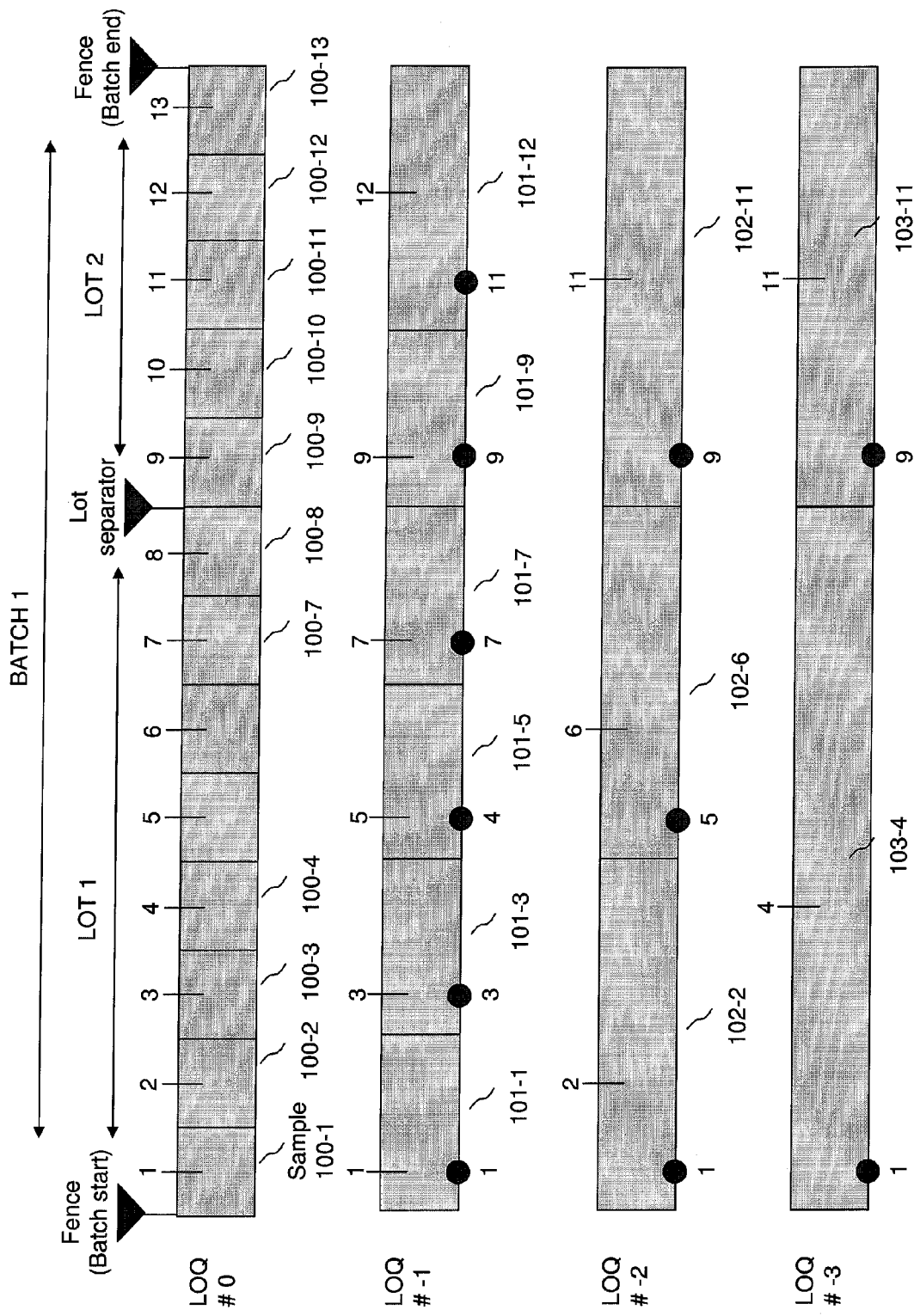
FIGS. 4A and 4B are example diagrams of the processing of a sequence of images.
Figure 4B:
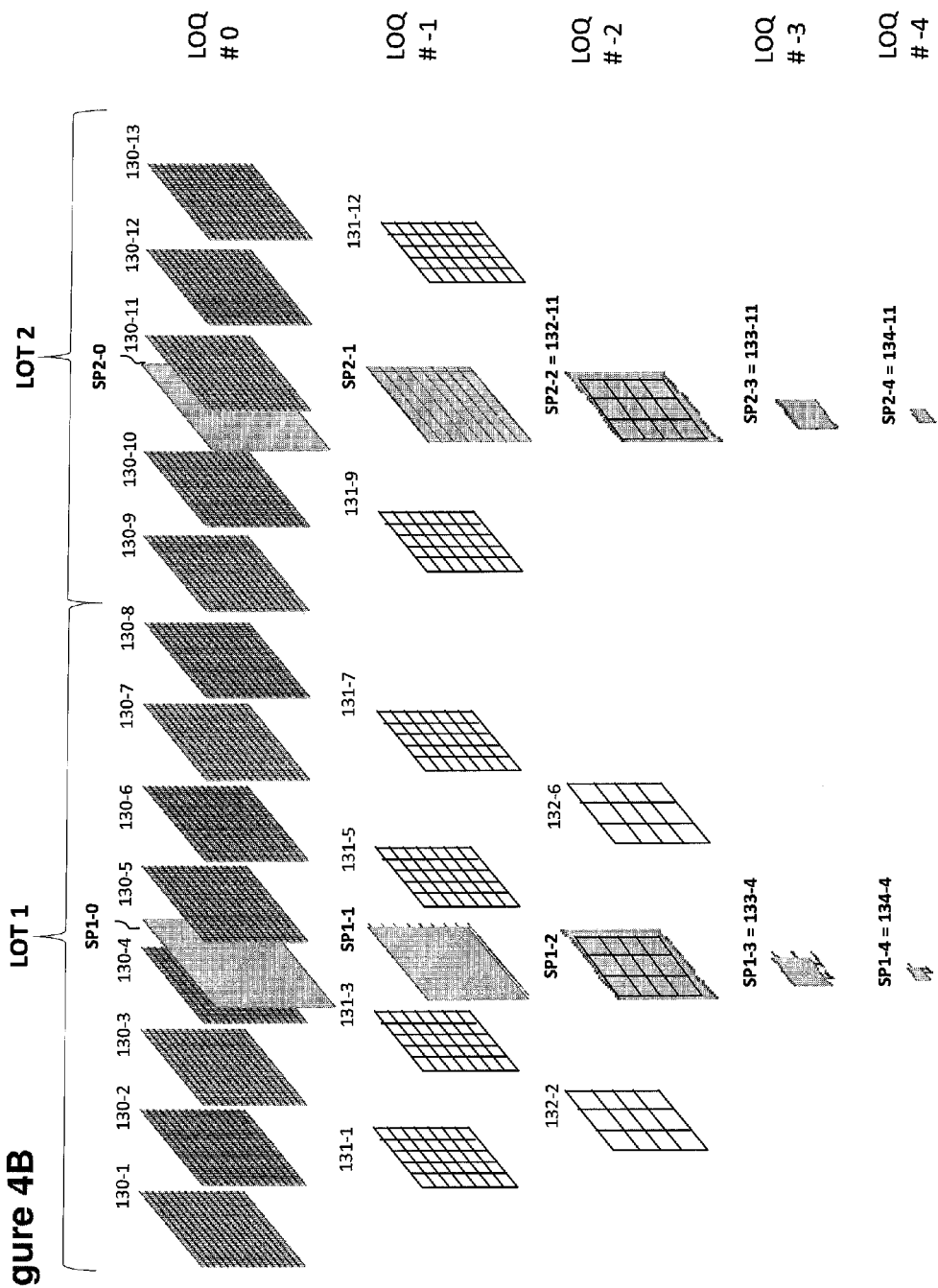

FIG. 4A and FIG. 4B are example diagrams illustrating a non-limiting example embodiment of three-dimensional time-based signal encoded in a tiered temporal hierarchy with multipredictive encoding, and in particular by also leveraging supporting planes in order to encode residual data. The example input signal is a sequence of images, which for all practical purposes we can think of as a video signal consisting of a sequence of two-dimensional frames sampled over time. Plane 100-1 of display elements can represent image sample data at time T1 (i.e., sampling position T1); plane 100-2 of display elements can represent image sample data at time T2; plane 100-3 of display elements can represent image sample data at time T3; and so on. Images of the highest (original) level of quality (LOQ #0, or equivalently tier #0) are organized in a "batch" (i.e., time chunk) consisting of two "lots" LOT 1 and LOT 2 or in other words two subsequences of images.

The signal illustrated in FIG. 4A and FIG. 4B is encoded in a tiered hierarchy, with the four topmost levels of quality LOQ #0, LOQ #−1, LOQ #−2 and LOQ #−3 shown in the figures. This is intended as non-limiting, since a signal could be encoded with a higher number of levels of quality and in principle the lowest level has a single span consisting of a single element. Level of quality LOQ #−1 consists of four samples for LOT 1 (samples 101-1, 101-3, 101-5, 101-7) and two samples for LOT 2 (samples 101-9 and 101-12). In this non-limiting embodiment, lots at LOQ #−1 have a lower number of samples than the same lot at LOQ #0, i.e. samples of LOQ #−1 were obtained by means of temporal downsampling. The hyperplanes of elements (i.e., in the example of video frames, the two dimensional planes of pixels) corresponding to samples of LOQ #−1 are also downsampled, with suitable scale factors for each spatial dimension, with respect to hyperplanes of elements corresponding to spans of LOQ #0: in this non-limiting example, hyperplanes have two dimensions (e.g., representing a two-dimensional image), and each dimension is downsampled by a factor of 2 for every level of quality of the hierarchy to the next, introducing lines or columns of padding when it is necessary in order to guarantee divisibility by two.

FIG. 4A shows the images themselves, illustrating how images that result from temporal downsampling have a longer "time span", since they correspond to multiple samples at a higher LOQ. For instance, image 102-2 at LOQ #−2 has a time span equal to four samples at LOQ #0.

FIG. 4B does not show the images themselves, but shows instead the sets of absolute residuals R corresponding to each of the images and the support planes for each of the lots at each of the shown LOQs. FIG. 4B illustrates how the amount of residual data for images at different levels of quality has increasingly lower spatial resolutions (i.e., amounts of elements), and—for the LOQs and the lots in which framing is applied to the support plane—the rendition of a given support plane at a given level of quality has a higher amount of elements than sets of absolute residuals corresponding to an image of the same level of quality supported by said support plane.

In this non-limiting embodiment, a support plane for a lot is centered at the integer sampling position of LOQ #0 that is immediately lower than or equal to the average of the sampling positions of the images of the lot at LOQ #0. In particular, the chain of support planes SP1 for lot 1 is centered at sampling position t=4, while the chain of support planes SP2 for lot 2 is centered at sampling position t=11.

For the specific example case, reconstructing absolute residuals for a lot up to LOQ #−3 is equivalent for both lots to just reconstructing the supporting chain, i.e., set of absolute residuals 134-4 coincides with Support Plane SP1–4, set of absolute residuals 133-4 coincides with Support Plane SP1–3, etc. On the contrary, the support plane has its own distinct identity for levels of quality where a lot is represented by more than one image. For instance, for LOQ #−2 of lot 1, support plane SP1–2 is different from sets of absolute residuals R 102-2 and 102-6.

In order to generate suitable sets of encoded reconstruction data, a signal processor configured as an encoder that receives a signal made of a sequence of images at a given sample rate first of all identifies the time portion of the signal that will be included in a batch, and its subdivision in lots. Batches are necessary due to the practical problem that the time dimension is often unbounded (at least for all practical purposes), while spatial dimensions have clear and fixed native boundaries (e.g., the horizontal and vertical resolution of a video frame, the number of values representing a sound sample, the x-y-z resolution of a volumetric image, etc.). Thus it is often practically unfeasible, even if ideally the best option, to analyse the signal along its whole duration in time. However, a signal—in practical non-limiting examples such as motion pictures and shootings—is often natively a concatenated chain of unrelated chunks: e.g., typically motion pictures contents are divided in "scenes", i.e., time-limited amounts of correlated images separated by very evident scene changes. These "scene batches" can serve as a valid reference to partition in time the signal before encoding. When these batches are very long, however, it is necessary to further segment the sequence of images. Without appropriate countermeasures, partitioning a scene into "independent portions for computation" can lead to evident artifacts: noise patterns suddenly change, smooth movements show discontinuities, etc. The novel methodology used by the non-limiting embodiment described herein comprises the use of "lots" (i.e., downsampling the hierarchy lot by lot, independently) and a "decoding wave" approach (i.e., upsampling the hierarchy across lots). By means of such novel methods, the scene is indeed partitioned in order to make computation practical with current architectures. Such partitions are "bridged" during decoding, avoiding rigid separations, and consequently avoiding discontinuities in the reconstructed rendition of the signal.

If the batch consists of just a few images, there is no need to partition it further. Assuming instead a batch lasting for many images (i.e., above a given threshold), the encoder slices the batch in "lots". As indicated above, a lot is a consecutive number of spans. Lot lengths in the range from 1 to 128 spans and batches made of 1 to 5 lots are non-limiting examples for durations of lots and batches. From a practical point of view, such lengths are adjusted to the hardware, memory and processing units used in a given embodiment. The decision on lot dimension is the result of an optimization process performed at the encoder side. A non-limiting criterion is to maximize the lot length within a highly time-correlated batch, given any requirements on the decoder resource (in particular memory requirements), at the given profile produced by the encoder. Another non-limiting criterion is to keep as much as possible a fixed lot size and in particular setting it to either a fixed number of images or to one image (e.g., before or after very uncorrelated images), so as to simplify computations.

The encoder performs motion estimation across the signal, generating suitable descriptive information comprising number of parameters such as auxiliary maps, motion vectors, motion zone maps, motion matrixes, etc. and representing motion of the objects represented in the signal spans. Depending on motion estimation results, the encoder may modify the number of images included in batches and lots, for example taking into account scene changes in the case of a video signal. Lot length is shortened by the encoder whenever the time correlation of images along time decreases below given thresholds. Based on suitable metrics corresponding to the activity of the signal during the batch in terms of motion, lot lengths are thus assigned essentially on an inverse proportionality basis. In a non-limiting embodiment, lot length is defined based on said metrics by leveraging pre-set experimental parameters as well as suitable heuristics.

Encoding and decoding operations work according to methods illustrated above. A signal processor configured as an encoder ("the encoder") receives a rendition of a signal (e.g., a sequence of two-dimensional images at constant sample rate, wherein each of the images is characterized by a given sampling position and a given duration) at an original level of quality ("LOQ #0"). The encoder starts by processing the signal and generating motion information. Based at least in part on said motion information, the encoder identifies a suitable sequence of images to be encoded independently of previous and subsequent sequences (i.e., a "Batch"); the encoder, based at least in part on suitable encoding parameters, also divides the batch into one or more "lots" of images. More specifically, as illustrated in FIG. 4B, the encoder identifies a Batch of 13 images and divides it into a lot 1, consisting of 8 images, and a lot 2, consisting of 5 images.

Within each lot, the encoder starts performing suitable downsampling and/or blending and/or downblending operations (also including motion compensation operations in order to suitably account for motion across images), generating lower levels of quality for the signal. When images of a lower level of quality are the result of the combination of motion-compensated images at a higher level of quality (as opposed to just a spatial downsampling of a image at a higher level of quality), the encoder introduces a degree of "framing" by adding additional rows and columns to the images of the lower level of quality, beyond the actual image ("destination plane") that would be shown whereby the signal had to be displayed at that level of quality. For the sake of readability, the actual images of the signal are not shown in FIG. 4B.

When one of the dimensions of a downsampled rendition of a lot reaches a resolution of 1 element, downsampling for subsequent lower tiers proceeds by downsampling only along the remaining dimensions. For instance, at LOQ #−2 lot 2 reaches a time resolution equal to 1 element (i.e., the entire lot is represented by only one image), hence downsampling of lot 2 from LOQ #−2 to LOQ #−3 proceeds by downsampling only along spatial dimensions (which typically have a much higher resolution).

The downsampling process within each lot continues until a bottom level of quality is reached. In the non-limiting example of FIG. 4, the bottom LOQ is LOQ #−4.

Once the encoder generated the bottom LOQ #−4, the encoder generates sets of absolute residuals 134-4 and 135-11 for the bottom level (in this simple non-limiting embodiment, by quantizing the elements of the two images of the bottom level); at LOQ #−4, said sets of absolute residuals 134-4 and 135-11 also coincide, respectively with support planes SP1-4 and SP2-4 for lot 1 and lot 2 at LOQ #−4. As a consequence, at LOQ #−4 Support Plane Residuals $R^I$ coincide with absolute residuals R, and Relative Residuals $R^{II}$ are all equal to zero.

The encoder then starts simulating the operations performed at a decoder side, performing suitable upsampling operations and generating predicted images for LOQ #−3. In this non-limiting embodiment, the encoder leverages temporal upsampling operations with kernels including two elements per dimension up until LOQ #−1 and four elements per dimension from LOQ #−1 to LOQ #0. As already mentioned before, this is due to the fact that at lower LOQs elements are more distant both in time and space, so correlation among elements is likely to be relatively local (e.g., it brings limited benefits, and sometimes it is even counterproductive, to "ask for contributions" to uncorrelated images).

By comparing predicted images with the downsampled images of the tiered hierarchy generated via downsampling, the encoder generates sets of absolute residuals 133-4 and 133-11, which again coincides with the two support planes SP1-3 and SP2-3 at LOQ #−3.

The encoder, based on reconstructed renditions for LOQ #−3, proceeds by generating predicted images for LOQ #−2. By comparing predicted images with the downsampled images of the tiered hierarchy generated via downsampling, the encoder generates sets of absolute residuals 132-2, 132-6 and 132-11. At LOQ #−2, lot 1 consists of two images, so the support plane no longer coincides with any set of absolute residuals, but it is effectively a set of support elements to be used for predicting the two sets of absolute residuals 132-2 and 132-6. The encoder thus proceeds with calculating support plane SP1-2, first of all by calculating its "ideal" (i.e., pre-encoding and reconstruction) rendition S:

$$S_1^2 = \frac{1}{2}(MC(132-2) + MC(132-6))$$

wherein motion compensation operations MC are performed relatively to the sampling position of support plane SP1-2, i.e., t=4.

Since in this non-limiting embodiment support planes are also encoded according to a tiered hierarchical method, the encoder then proceeds to generating reconstruction data for the support plane, starting from calculating, by applying suitable upsampling operations to support plane SP1-3 at LOQ #-3, predicted support plane V. The encoder then calculates Support Plane Residuals $R^I$:

$$R^I = S - V$$

As a consequence, the encoder (simulating the operations that will be performed at a decoder) reconstructs the rendition of Support Plane SP1-2 (mathematically described as "Z"):

$$Z = V + DQ(Q(R^I)) = V + \hat{R}^I$$

The encoder is now able to generate sets of relative residuals for the two images of LOQ #-2 of lot 1 (not shown in the figure), by calculating the difference between sets of absolute residuals R 132-2 and 132-6 and motion-compensated renditions (with respect to the sampling position of each corresponding image) of Support Plane SP1-2.

The encoder proceeds in a similar way up to the highest LOQ, generating all of the necessary reconstruction data (e.g., in this non-limiting example case, Support Plane Residuals, Relative Residuals and descriptive information for each LOQ of each lot).

At a decoder side, a signal processor configured as a decoder essentially performs the same operations simulated at the encoder side in order to generate reconstruction data. The decoder starts by receiving a data stream and decoding synch marker metadata in order to identify, also based on suitable decoding parameters, the sequence of images to be reconstructed. Starting from the lowest LOQ, the decoder reconstructs predictions for the images of a higher LOQ, reconstructs support plane data, reconstructs absolute residual data by suitably combining support plane data with relative residual data, and consequently reconstructs renditions for images of the higher LOQ.

Once reconstructed a suitable LOQ, the signal processor presents the reconstructed signal to a user, for instance by transmitting it to a playback device. Depending on the reconstruction data that has been received and/or on real-time decoding constraints and/or on other constraints (e.g., minimizing computing power consumption, minimizing electrical power consumption, minimizing absorbed bandwidth, maximizing playback speed, etc.) and/or responding to specific input parameters, the decoder can also stop the decoding at different LOQs for different portions of the signal.

The illustrated embodiment should be considered as non-limiting, and people skilled in the art can easily infer how to combine all of the non-limiting embodiments and methods discussed so far with the example embodiment illustrated in FIGS. 4A and 4B.

In other non-limiting embodiments, the support plane for a given LOQ of a given lot is calculated not by performing a weighted average along time of motion compensated absolute residuals, but by performing a weighted average along time of the actual motion compensated images. Absolute residuals for a given image can thus be obtained by combining the corresponding Relative Residuals with the differences between the predicted image for the given image and a motion compensated rendition of the support plane; having said that, these embodiments don't require the decoder to produce absolute residuals, because the decoder can generate a rendition of the signal at the given LOQ by just combining the motion compensated support plane with relative residuals. In such embodiments, a support plane for a given LOQ actually represents all of the correlated information of the lot (as opposed to just the correlated residual data). These non-limiting embodiments are especially useful in absence of a tiered hierarchy of LOQs.

In other non-limiting embodiments, support plane information of neighboring lots is suitably leveraged (e.g., by computing a weighted average of the motion compensated renditions of the support planes) in order to generate predictions for the absolute residuals of images.

In other non-limiting embodiments, support planes of neighboring lots are encoded in a tiered hierarchy of levels of aggregation, i.e., two or more support planes at a level of aggregation are encoded based on a higher-order support plane at a higher level of aggregation.

Figure 5A:
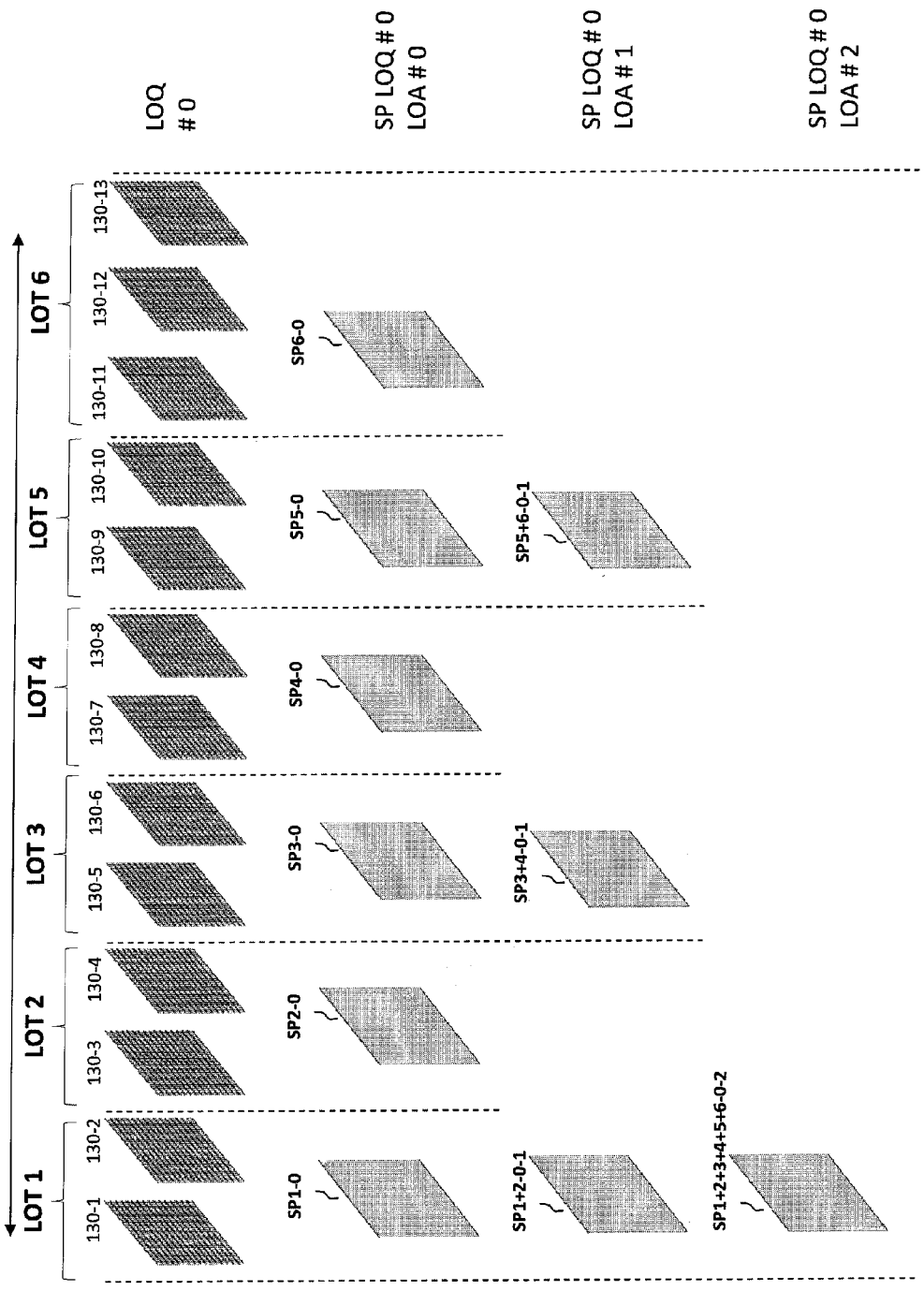
FIGS. 5A and 5B are example diagrams of the processing of a sequence of images.
Figure 5B:
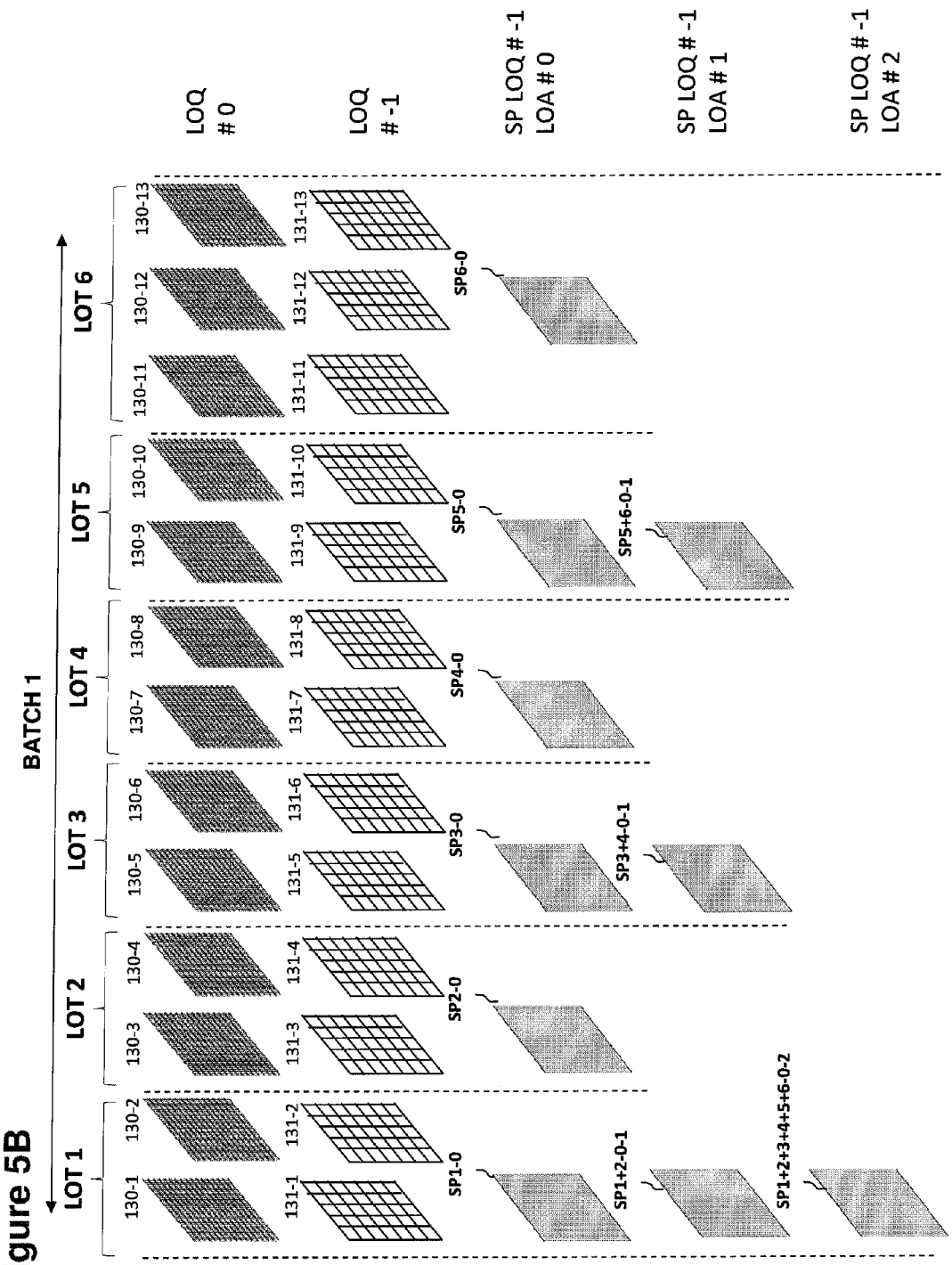

FIGS. 5A and 5B are example diagrams illustrating a non-limiting example embodiment of support planes for absolute residuals of a given LOQ, wherein said support planes are encoded in a tiered hierarchy of levels of aggregation. The example input signal is the same as the one described in FIGS. 4A and 4B, which for all practical purposes we can think of as a video signal consisting of a sequence of two-dimensional frames (our images, for the purpose of the method). However, the division of the batch of the signal in lots is different, and also the downsampling operations used to obtain LOQ #-1 based on LOQ #0 are different. In particular, differently from the non-limiting embodiments illustrated in FIGS. 4A and 4B, in this non-limiting embodiment LOQ #-1 is obtained via simple spatial downsampling, i.e., maintaining the same sample rate as LOQ #0. A similar configuration is preferred wherein the sample rate of the topmost LOQ is relatively low, in order to avoid excessive drops in the quality of the rendition at LOQ #-1.

Like in FIG. 4B, FIGS. 5A and 5B graphically show the sets of absolute residuals R corresponding to each of the images (as opposed to showing the images themselves) and the support planes for each of the lots. FIG. 5A only shows the topmost LOQ #0 of the signal, for readability purposes, while FIG. 5B shows what happens with the support planes of the next lower LOQ #-1. As already mentioned, in this specific non-limiting embodiment, the next lower LOQ of the signal, shown in FIG. 5B, has the same sample rate as the topmost LOQ, but lower spatial resolution.

Similarly to what shown in FIG. 4, each of the support planes SP1-0, SP2-0, . . . , SP6-0 supports the reconstruction of the sets of absolute residuals of the corresponding lot. Differently from what shown in FIG. 4, however, instead of reconstructing SPi-0 based on a corresponding support plane of the same lot at a lower level of quality, this non-limiting embodiment encodes and decodes support planes based on a specific tiered hierarchy of levels of aggregation produced for LOQ #0 (i.e., without performing spatial downsampling, but only motion-compensated temporal blending).

In particular, a signal processor configured as an encoder produces sets of absolute residuals R 130-1, . . . , 130-13 for each of the images at LOQ #0 and generates support planes SP1-0, SP2-0, . . . , SP6-0, wherein each plane is obtained by combining suitably motion-compensated renditions of the sets of absolute residuals of the corresponding lot. In this simplified non-limiting embodiment, lots are chosen to be made of maximum three images, and the sampling position of a support plane is equal to the sampling position of the first image of each given lot. Support planes SP1-0, ..., SP6-0 are said to be support planes for LOQ #0 at level of aggregation (LOA) #0.

The encoder then proceeds to encode support planes SP1-0 and SP2-0 according to a higher-order support plane SP1+3-0-1 at a higher level of aggregation (LOA #1). In particular, the encoder produces SP1+3-0-1 by combining suitably motion-compensated renditions of SP1-0 and SP2-0, according to the sampling position of SP1+3-0-1 (in this embodiment set to the sampling position of SP1-0, i.e., the lower of the sampling positions of the planes that are combined into the higher-order support plane). The encoder generates Support Plane Residuals $R^{I*}$ (not shown in the figure) for each of the support planes SP1-0 and SP2-0 based on a difference between said planes and a motion-compensated rendition of support plane SP1+3-0-1, according to the following formula:

$R^{I*}=S-MC(SP1+2-0-1)$ $Z=MC(SP1+2-0-1)+DQ(Q(R^{I*}))=MC(SP1+2-0-1)+\hat{R}^{I*}$ Wherein S represents a support plane (i.e., either SP1-0 or SP2-0) as initially calculated by the encoder and Z represents the reconstructed rendition of said support plane at a decoder side (simulated by the encoder in order to suitably generate residual data, based on what the decoder is able to reconstruct).

According to the same methods, the encoder produces higher-order support planes SP3+4-0-1 and SP5+6-0-1, as well as the sets of Support Plane Residuals $R^{I*}$ (one set per each support plane) that are necessary to reconstruct support planes SP3-0 and SP4-0 based on higher-order support plane SP3+4-0-1, and support planes SP5-0 and SP6-0 based on higher-order support plane SP5+6-0-1.

In another non-limiting embodiment, the encoder encodes also higher-order support planes at LOA #1 according to one or more yet-higher-order support planes at LOA #2 (e.g., higher-order support plane SP1+2+3+4+5+6-0-2 shown in FIG. 5). In these embodiments, the encoder produces support planes up to the highest level of aggregation before starting to produce sets of Support Plane Residuals $R^{I*}$ (simulating the reconstruction process at a decoder side by starting from the highest level of aggregation).

At a decoder side, the decoder reconstructs support planes at LOA #0 (i.e., the support planes necessary in order to reconstruct sets of absolute residuals) by receiving and decoding reconstruction data corresponding to higher-order support planes for the batch of lots at the highest level of aggregation. The decoder then reconstructs predictions for support planes at the next lower level of aggregation, and adjusts said predictions based on received sets of Support Plane Residuals $R^{I*}$. The decoder reconstructs the tiered hierarchy of support planes up to (or better, down to) the lowest level of aggregation.

As illustrated in FIG. 5B, every LOQ of a given batch of the signal has its own tiered hierarchy of levels of aggregation of support planes. In this non-limiting embodiment, the tiered hierarchy of support planes of a given LOQ is independent of the tiered hierarchies of support planes of other LOQs of the signal.

Figure 6:
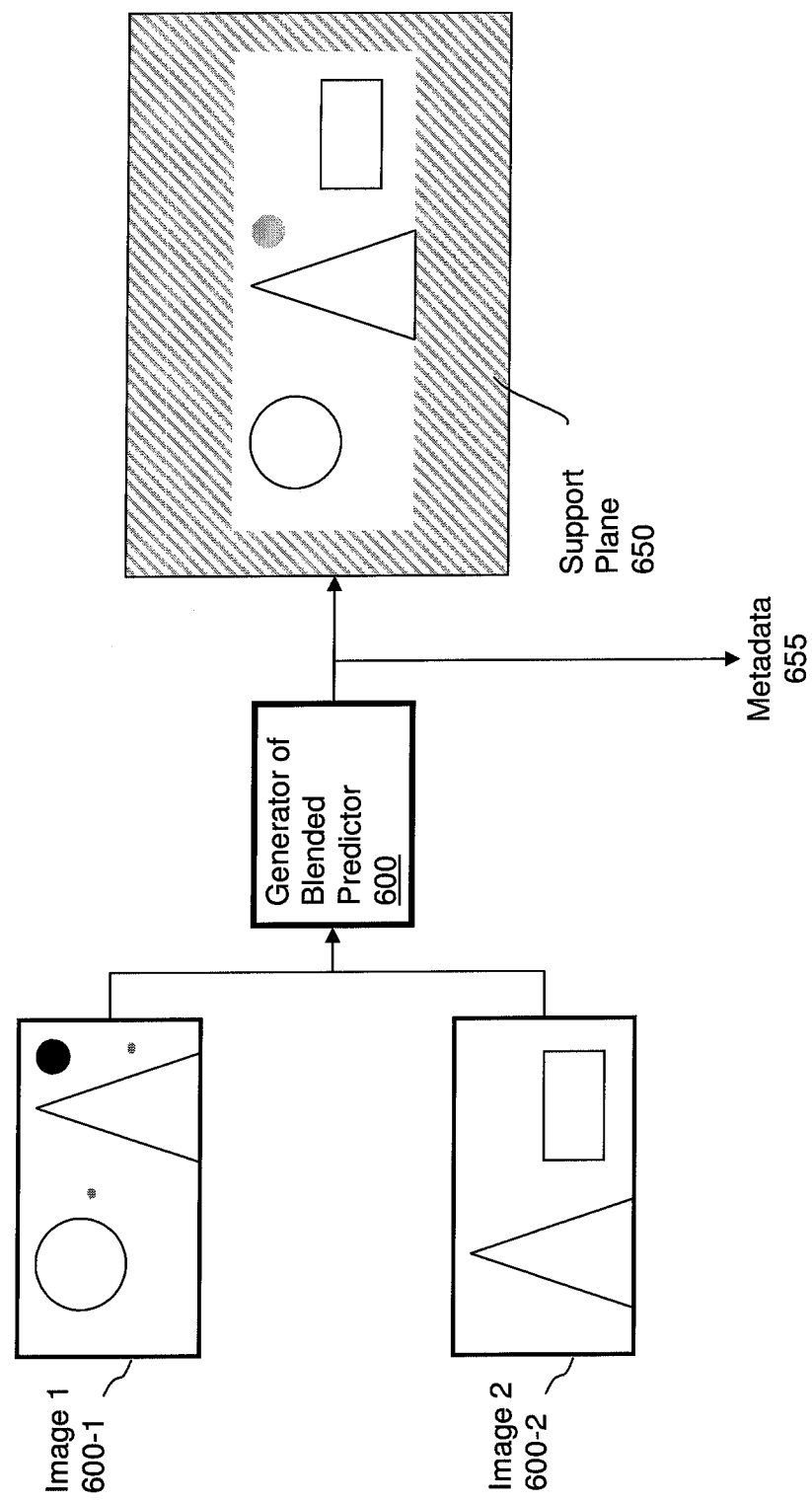
FIG. 6 is an example diagram illustrating encoding of images based on a common blended predictor image.
Figure 7:
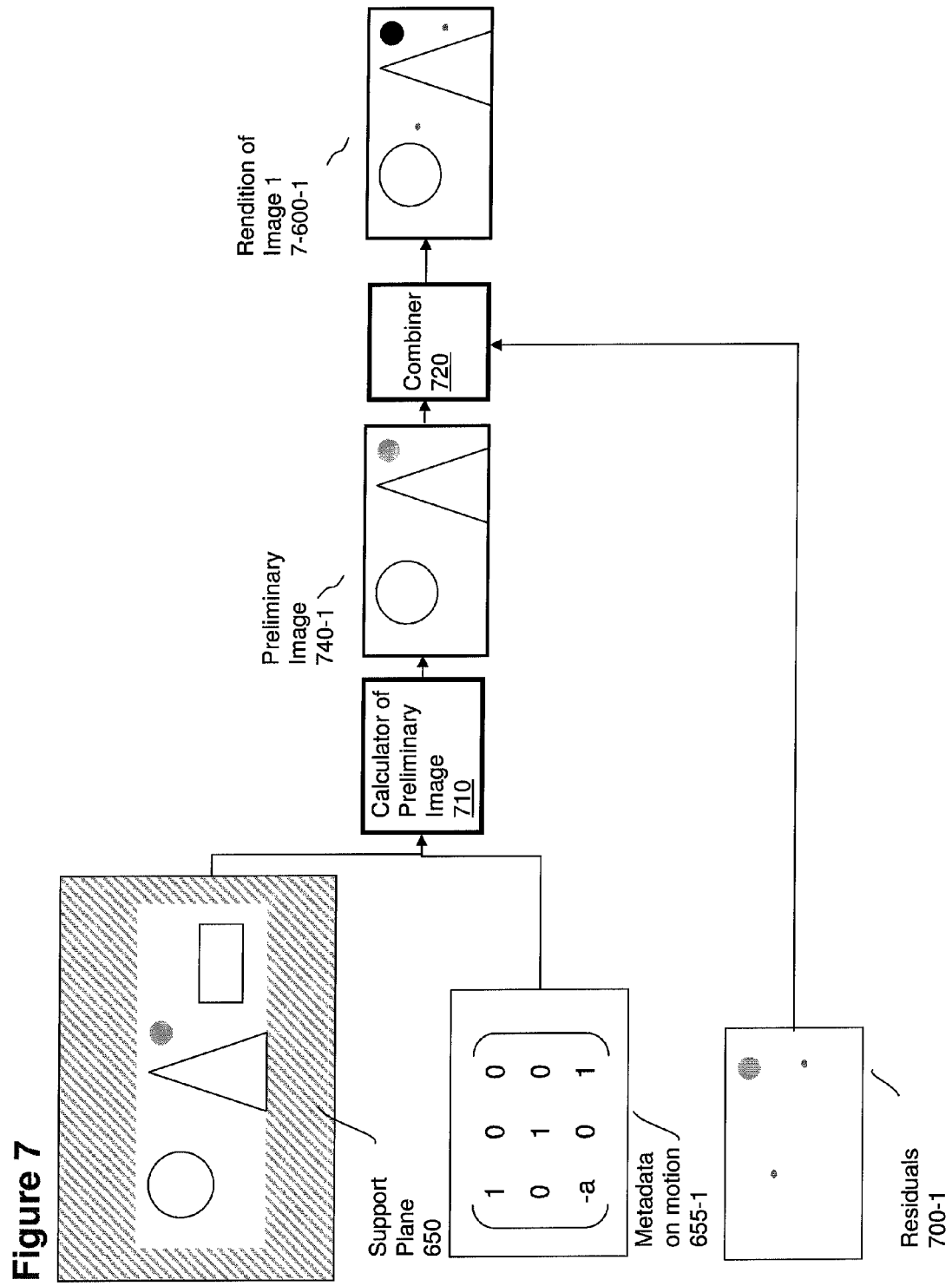
FIG. 7 is an example diagram illustrating encoding of images based on a common blended predictor image.

FIGS. 6 and 7 further illustrate a non-limiting embodiment of encoding and decoding of sets of absolute residuals based on a support plane.

In a signal processor configured as an encoder, Images 600-1 and 600-2 are processed by Generator of Blended Predictor 600, producing Support Plane 650 and Metadata 655.

As illustrated in FIG. 7, signal processor configured as a decoder receives Support Plane 650, Metadata on motion 655-1 and Relative Residuals 760-1. Calculator of Preliminary Image 710 processes Support Plane 650 based on Metadata on motion 655-1, producing Preliminary Image 740-1. Combiner 720 then combines Preliminary Image 740-1 with Residuals 760-1, producing Rendition of Image 1 7-600-1 (i.e., a reconstructed rendition corresponding to the encoded Image 600-1).

Figure 8:
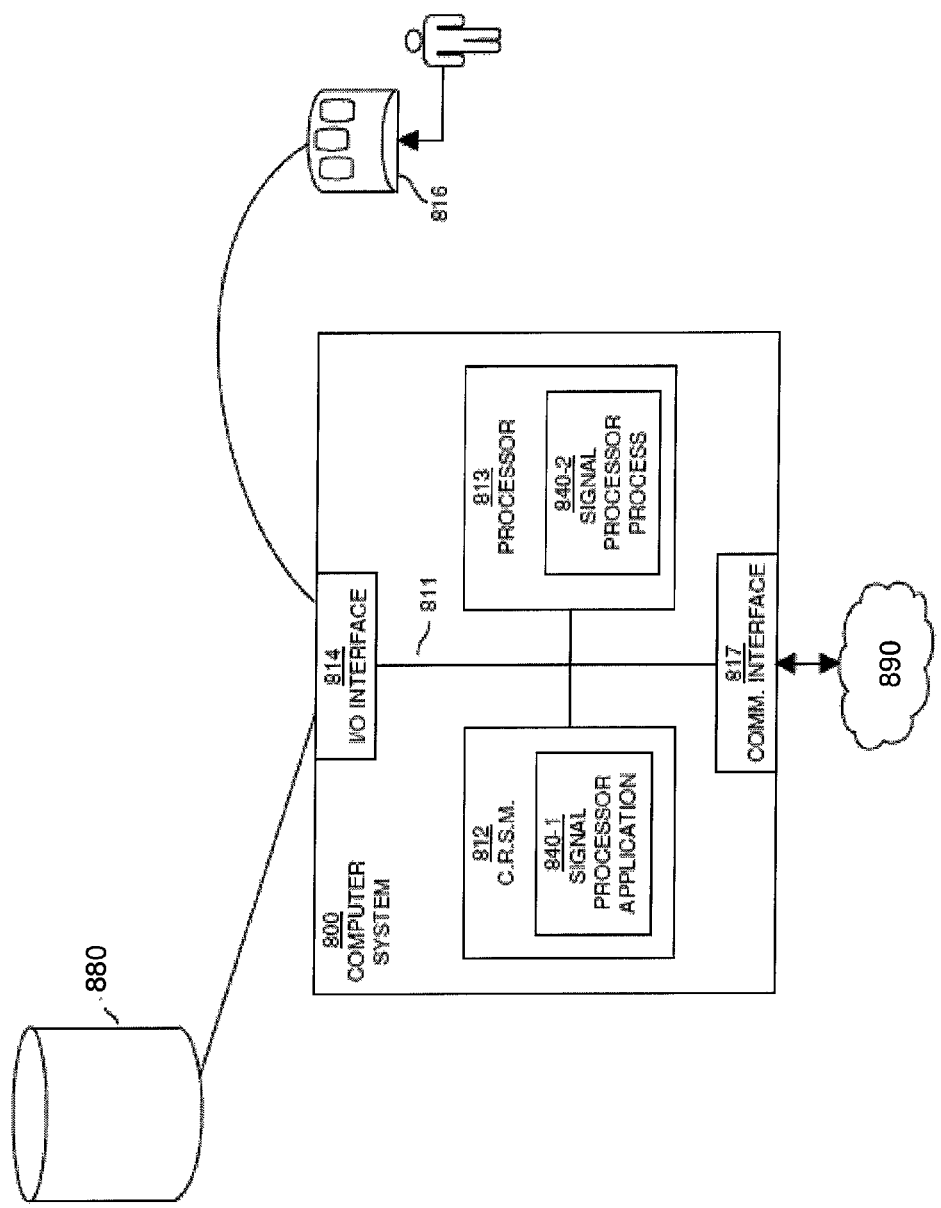
FIG. 8 shows a block diagram of a computer system that provides data processing according to embodiments described herein.

FIG. 8 is a block diagram of a computer system 800 that provides computer processing according to embodiments herein.

Computer system 800 can be or at least include a computerized device such as a personal computer, processing circuitry, television, playback device, encoding device, workstation, portable computing device, mobile phone, tablet, console, set top box, network terminal, processing device, network device, operating as a switch, router, server, client, etc.

Note that the following discussion provides a basic embodiment indicating how to carry out functionality associated with a signal processor as previously discussed. However, it should be noted that the actual configuration for carrying out the operations as described herein can vary depending on a respective application.

As shown, computer system 800 of the present example comprises a communication bus 811, which provides communication with a computer readable storage media 812 such as a non-transitory computer-readable storage medium, etc., in which digital information can be stored and retrieved.

Computer system 800 can further comprise a processor 813, an I/O interface 814, and a communications interface 817.

In one embodiment, I/O interface 814 provides connectivity to repository 880, and if present, to a screen display, audio speakers, peripheral devices 816 such as a keyboard, a computer mouse, etc.

As briefly mentioned above, the computer readable storage media 812 can be any suitable device and/or hardware such as memory, optical storage, solid state storage, hard drive, floppy disk, etc. In one embodiment, the storage media 812 is a non-transitory storage media (i.e., non-carrier wave media) configured to store instructions associated with a signal processor application 840-1. The instructions are executed by a respective resource such as the processor 813 in order to perform any of the operations as discussed herein.

The communications interface 817 enables computer system 800 to communicate over a network 890 in order to retrieve information from remote sources and communicate with other computers, switches, clients, servers, etc. The I/O interface 814 also enables processor 813 to retrieve or attempt retrieval of stored information from repository 880.

As shown, the computer readable storage media 812 can be encoded with signal processor application 840-1 executed by processor 813 as a process 840-2.

Note that the computer system 800 can be embodied to include a computer readable storage media 812 for storing data and/or logic instructions.

The code associated with the signal processor application 840-1 can implement the functionalities of the signal processors illustrated herein and/or other resources necessary to implement the invention discussed herein.

During operation of one embodiment, processor 813 accesses computer readable storage media 812 via the communication bus 811 in order to launch, run, execute, interpret or otherwise perform the instructions of signal processor application 840-1 stored in computer readable storage media 812. Execution of the signal processor application 840-1 produces processing functionality in processor 813. In other words, the signal processor process 840-2 associated with processor 813 represents one or more aspects of executing signal processor application 840-1 within or upon the processor 813 in the computer system 800.

Those skilled in the art will understand that the computer system 800 can include other processes and/or software and hardware components, such as an operating system or other software that controls allocation and use of hardware processing resources to execute signal processor application 840-1.

In accordance with different embodiments, note that computer system may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, smartphone, tablet, video game console, handheld video game device, a peripheral device such as a switch, modem, router, or, in general, any type of computing or electronic device.

Functionality supported by the different resources will now be discussed via flowcharts in FIGS. 9-12. Note that the steps in the flowcharts below can be executed in any suitable order.

Figure 9:
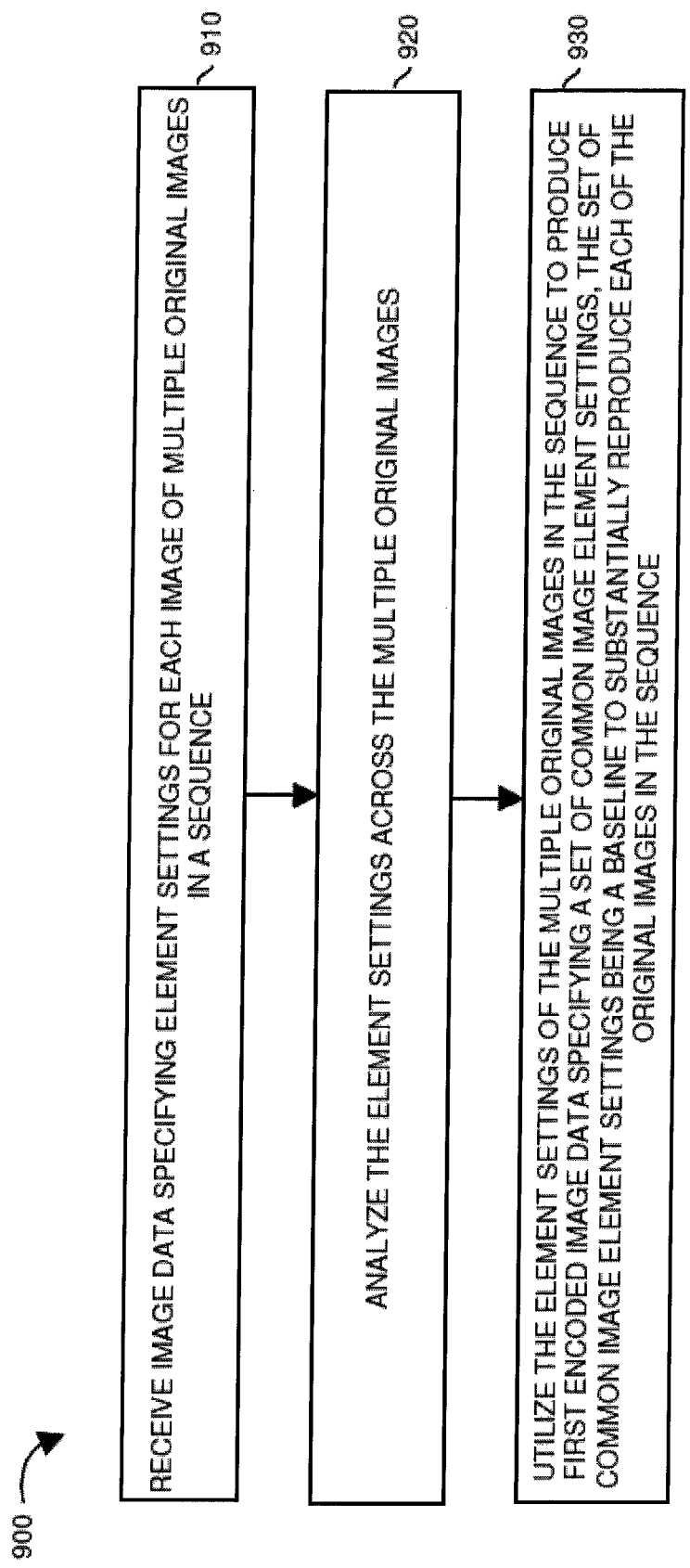
FIGS. 9-12 are example flow diagrams illustrating processing of images according to embodiments described herein.

FIG. 9 is a flowchart 900 illustrating an example method according to embodiments illustrated herein. Note that there will be some overlap with respect to concepts as discussed above.

In processing block 910, computer processor hardware receives image data specifying element settings for each image of multiple original images in a sequence.

In processing block 920, computer processor hardware analyzes the element settings across the multiple original images.

In processing block 930, computer processor hardware utilizes the element settings of the multiple original images in the sequence to produce first encoded image data specifying a set of common image element settings, the set of common image element settings being a baseline to substantially reproduce each of the original images in the sequence.

Figure 10:
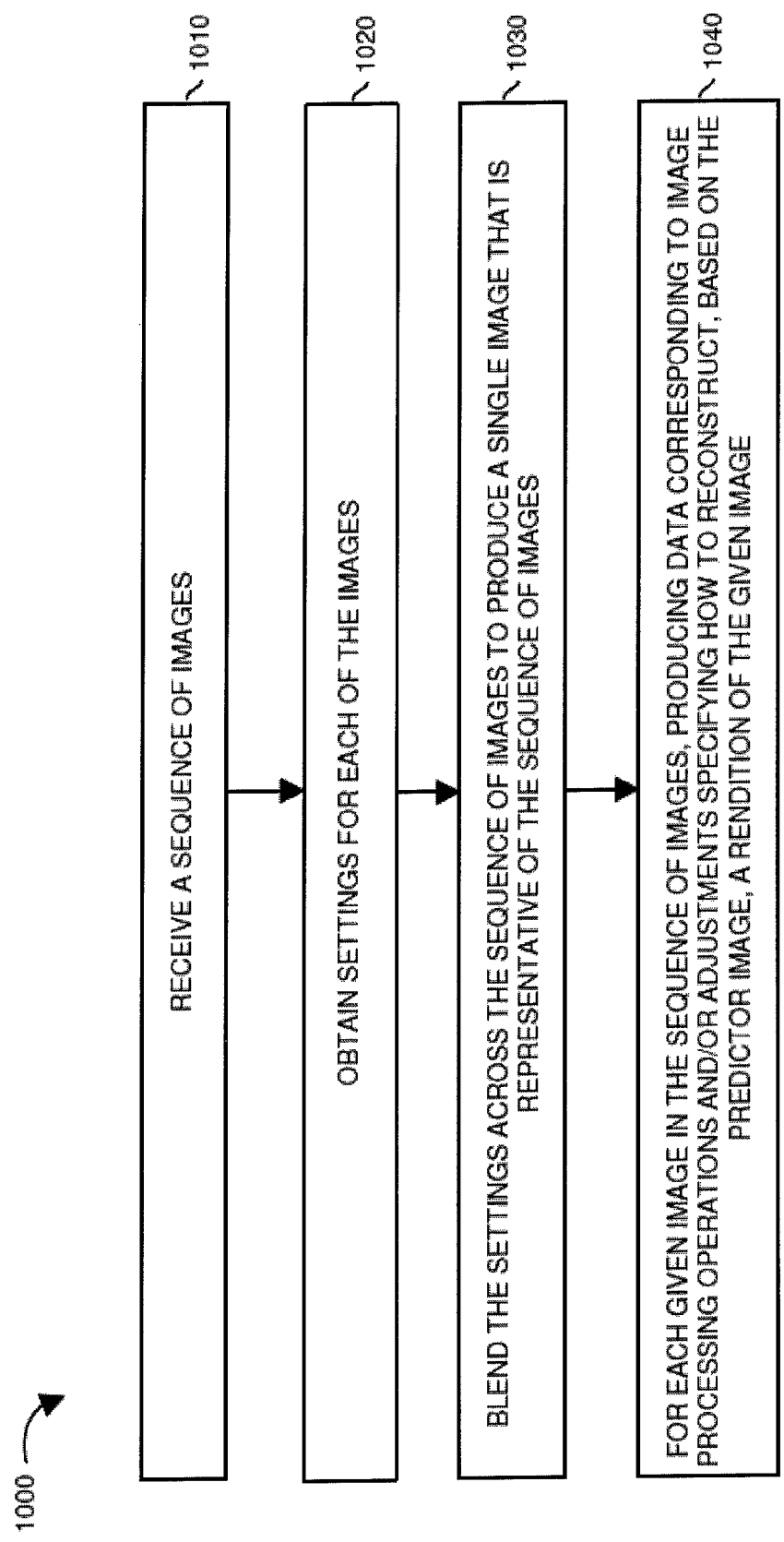

FIG. 10 is a flowchart 1000 illustrating an example method according to embodiments. Note that there will be some overlap with respect to concepts as discussed above.

In processing block 1010, computer processor hardware receives a sequence of images.

In processing block 1020, computer processor hardware obtains settings for each of the images.

In processing block 1030, computer processor hardware blends the settings across the sequence of images to produce a single image that is representative of the sequence of images.

In processing block 1040, for each given image in the sequence of images, computer processor hardware produces data corresponding to image processing operations and/or adjustments specifying how to reconstruct, based on the predictor image, a rendition of the given image.

Figure 11:
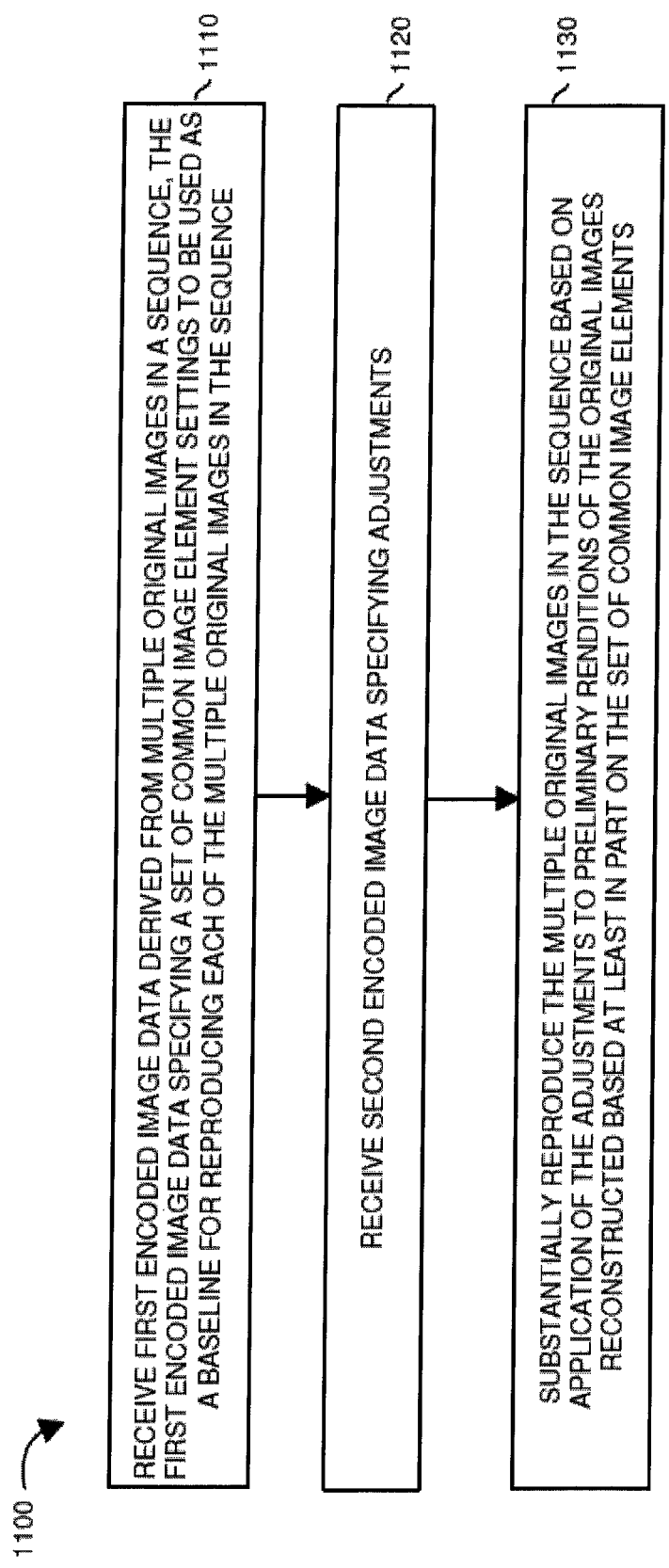

FIG. 11 is a flowchart 1100 illustrating an example method according to embodiments. Note that there will be some overlap with respect to concepts as discussed above.

In processing block 1110, computer processor hardware receives first encoded image data derived from multiple original images in a sequence, the first encoded image data specifying a set of common image element settings to be used as a baseline for reproducing each of the multiple original images in the sequence.

In processing block 1120, computer processor hardware receive second encoded image data specifying adjustments.

In processing block 1130, computer processor hardware substantially reproduce the multiple original images in the sequence based on application of the adjustments to preliminary renditions of the original images reconstructed based at least in part on the set of common image elements.

Figure 12:
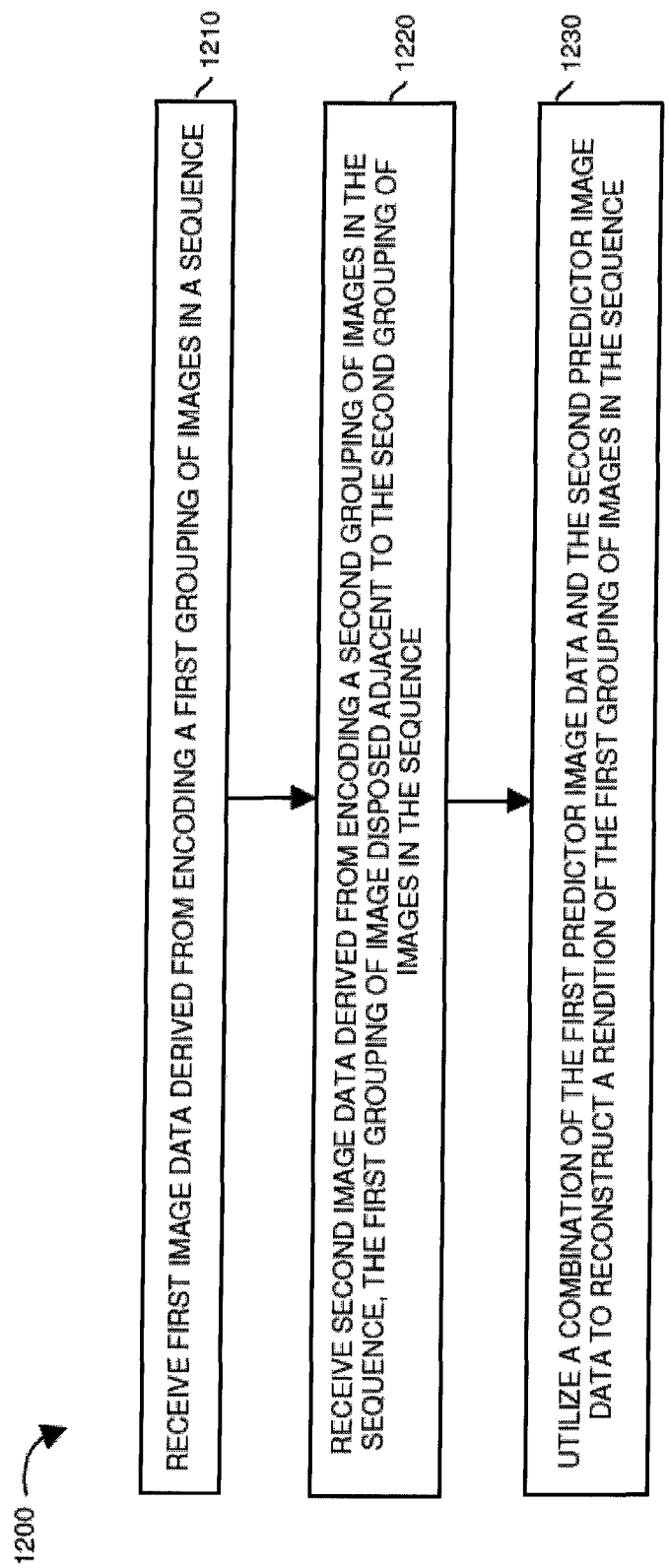

FIG. 12 is a flowchart 1200 illustrating an example method according to embodiments. Note that there will be some overlap with respect to concepts as discussed above.

In processing block 1210, computer processor hardware receives first image data derived from encoding a first grouping of images in a sequence.

In processing block 1210, computer processor hardware receive second image data derived from encoding a second grouping of images in the sequence, the first grouping of image disposed adjacent to the second grouping of images in the sequence.

In processing block 1210, computer processor hardware utilizes a combination of the first predictor image data and the second predictor image data to reconstruct a rendition of the first grouping of images in the sequence.

FIG. 13 is an example diagram illustrating of a processing system according to embodiments herein. The following embodiment is an example of processing as discussed above.

In view of the above embodiments, the encoder processor hardware 1330 combines the element settings of the multiple original images to produce the encoded data 1340-1. For example, computer processor hardware such as encoder processor hardware 1330 receives image data 1310 specifying element settings for each image of multiple original images 1320-1, 1320-2, and 1320-3 in a sequence (such as a video sequence of moving pictures). The encoder processor hardware 1330 analyzes the element settings across the multiple original images 1320. The encoder processor hardware 1330 then utilizes the element settings of the multiple original images 1320 in the sequence to produce first encoded image data 1340-1 (such as information indicating how to reproduce one or more support planes). The encoded image data 1340-1 (such as support plane information) specifies a set of common image element settings in the images 1320.

The set of common image element settings (such as a support plane) can be used as a baseline of information to substantially reproduce each of the original images 1320 in the sequence.

In one embodiment, for each given image of the images 1320 in the sequence: the encoder processor hardware 1330 produces encoded image data 1340-2 specifying image processing operations necessary to produce, based on the support plane information of common image element settings in the encoded image data 1340-1, a preliminary rendition of each of the images 1320; the encoder processor hardware 1330 can be configured to also produce encoded image data 1340-3 to specify adjustment values to apply to the settings of the preliminary rendition of a respective reconstructed support plane to substantially reproduce a rendition of the respective image.

In one embodiment, the encoded image data 1340-3 specifies adjustment values to apply to the set of common image element settings (or support plane) to reproduce the multiple original images 1320 in the sequence.

By further way of a non-limiting example, the encoded image data 1340-1 can be used to produce a one or more so-called predictor images. As mentioned, the predictor images can serve as a baseline to substantially reproduce at least one of the multiple original images in the sequence.

In accordance with further embodiments, as discussed herein, the encoded image data 1340-1 can be configured to include multiple sets of encoded data. Each of the sets of data can specify image renditions of a respective support plane at multiple levels of quality. As mentioned, each lower level of quality of the support plane can include fewer display elements and thus represent the support plane at a lower resolution. Thus, in one embodiment, the encoder processor hardware 1330 encodes each of the image renditions at the successively lower level of quality to be of successively lower resolutions.

The encoder processor hardware 1330 can produce one or more of the successively lower level of quality information for the support plane to include fewer image renditions.

As previously discussed in FIGS. 5A and 5B, embodiments herein include multiple levels of aggregation. In such an instance, the encoder processor hardware 1330 produces the first encoded image data 1340-1 to include multiple sets of encoded data, each of the sets can specify image renditions of the support plane at multiple successively higher levels of aggregation for the respective level of quality. For example, the encoder processor hardware 1330 can be configured to produce each successively higher level of aggregation specified by the first encoded data to include fewer image renditions. For example, in FIG. 5A, the level of aggregation #2 (highest level of aggregation) for support plane includes fewer renditions than lowest level of aggregation #0, which includes 6 renditions.

In one embodiment, the encoder processor hardware 1330 encodes each of the image renditions at the successively higher level of aggregation to be of a same resolution as image renditions at the lower level of aggregation. Thus, the rendition of the support plane at each level of aggregation can be substantially the same.

As an alternative, the encoder processor hardware 1330 can be configured to encode each of the image renditions at the successively higher level of aggregation to be of a different resolution than the lower levels.

The encoder processor hardware 1330 can be configured to produce encoded image data 1340-1 in any suitable manner. For example, the encoder processor hardware 1330 can be configured to subdivide the multiple original images at an original level into a first set of sub-groupings. At least one sub-grouping of the sub-groupings in the first set can include at least two images from the multiple original images. For each of the respective sub-groupings in the first set, the encoder processor hardware 1330 produces a respective image rendition at a first level (e.g., support plane level of aggregation #0) to be representative of a combination of the images in the respective sub-grouping. For example, the encoder processor hardware 1330 selects support plane 130-1 and support plane 130-2 and produces support plane SP1-0. The encoder processor hardware 1330 selects support plane 130-3 and support plane 130-4 and produces support plane SP2-0.

In the above example, the encoder processor hardware 1330 selects a pair of support planes to produce a respective combined support plane at support plane level of aggregation #0. In one embodiment, the encoder processor hardware 1330 varies a number of images included in each respective sub-groupings depending on a similarity of the original images (support planes) to each other.

In yet further embodiments, if desired, the encoder processor hardware 1330 varies a number of images included in each respective sub-grouping depending on motion information generated by analyzing the sequence of original images.

The encoder processor hardware 1330 can be configured to produce at least a portion of the encoded image data 1340-1 at a second level. For example, the encoder processor hardware 1330 can be configured to subdivide the image renditions (or support planes) at the first level into support planes at the level of aggregation #0. The rendition of support planes at the level of aggregation #0 can be divided into a second set of sub-groupings. For example, sub-grouping SP1-0 and sub-grouping SP2-0 can be grouped and combined to produce support plane SP1+2-0-1. In a similar manner, each of the sub-groupings at the support plane level of aggregation #0 can be combined to produce a rendition of the support plane at a next lower level of aggregation. At the last level of aggregation, the encoder processor hardware aggregates and combines rendition of support plane SP1+2-0-1, SP3+4-0-1, and SP5+6-0-1 to produce the rendition of the support plane SP1+2+3+4+5+6-0-2 at support plane level of aggregation #2.

In still further embodiments, the encoder processor hardware can be configured to identify a correlation of the element settings across the multiple original images 1320 (support planes). The encoder processor hardware produces encoded image data 1340-1 based at least in part on the identified correlation.

The multiple original images can be residual images representing residual data. Each of the residual images can be configured to specify adjustments to combine with a corresponding preliminary image in order to produce a reconstructed image.

Additional Encoder Embodiments

Referring again to FIG. 13, and in view of the embodiments as discussed herein, the encoder processor hardware 1330 can be configured to receive a sequence of images 1320. The encoder processor hardware 1330 obtaining display element settings for each of the images 1320. The encoder processor hardware 1330 blends the settings across the sequence of images 1320 to produce a single image ("predictor image") that is representative of the sequence of images 1320. For each given image in the sequence of images 1320, the encoder processor hardware 1330 produces respective data corresponding to image processing operations and adjustments ("residuals") specifying how to reconstruct, based on the predictor image (support plane), a rendition of each of the images.

In one embodiment, blending the settings across the sequence of images includes: overlaying the images with respect to each other; and combining the overlaid images to produce a single image (such as a support plane) representative of the sequence of images 1320.

Overlaying the image (potentially "warped" or motion compensated rendition of all or a portion of the image) comprises performing motion-compensation operations, which are based at least in part on motion of objects captured by the image with respect to the sampling position of the predictor image (support plane or combined image).

Each of the images 1320 in the sequence can be received in accordance with a first resolution. The encoder processor hardware 1330 can be configured to produce the predictor image or support plane to be at a second resolution, the second resolution lower than the first resolution.

As previously discussed with respect to FIG. 5, each of the images 1320 in the sequence can includes a rendition of one or more particular objects. Blending of the settings information associated with the images 1320 can includes: producing a rendition of the object in the single image (support plane image) based on a combination of renditions of the object in each of the multiple images. Thus, the rendition of the object in the support plane can be based on a combination of renditions of the object in multiple images.

As previously discussed, one of the images 1320 in the sequence may include display element settings corresponding to a respective unique visual artifact not found in any of the other images in the sequence. By way of a non-limiting example, the encoder processor hardware 1330 blends settings of elements in the images by producing the predictor image or support plane to include settings corresponding to the unique visual artifact.

In accordance with further embodiments, blending of the settings associated with images 1320 to produce the support plane can include identifying settings corresponding to a common object that is captured by each of the images in the sequence. The encoder processor hardware 1330 can be configured to align portions of the images in the sequence based at least in part on the common object. As mentioned, the images can be combined or stitched together to produce a support plane representative of the multiple images 1320.

During processing, the encoder processor hardware 1330 may identify settings corresponding to a unique object that is captured by fewer than all of the images in the sequence. The encoder processor hardware 1330 can be configured to produce the predictor image or support plane image to include a rendition of the common object and a rendition of the unique object.

As previously discussed, the sequence of images can include at least a first image 1320-1 and a second image 1320-2. The encoder processor hardware 1330 can retrieve a setting of an element in the first image; the element in the first image 1320-1 can represent a particular portion of an object in the first image 1320-1. The encoder processor hardware 1330 can be configured to retrieve a setting of an element in the second image 1320-2; the element in the second image 1320-2 can represent the particular portion of the object. The encoder processor hardware 1330 can blend the settings of the elements by computing a setting for the particular portion of the object in the predictor image (support plane) based at least in part on a combination of the setting of the element in the first image 1320-1 and the setting of the element in the second image 1320-2.

In accordance with yet further embodiments, the predictor image (support plane or combined image) is of a lower resolution than a resolution of the images in the sequence. The encoder processor hardware can be configured to receive the sequence of images; obtain settings for each of the images; and combine the images 1320 in the sequence to produce a single image ("predictor image" or support plane image) that is representative of the sequence. The single image can be of a lower resolution than a resolution of the images 1320 in the sequence.

Combining of the images can include: identifying settings corresponding to a common object at least partially captured by each of the images 1320 in the sequence; applying an image processing operation to the images 1320 in the sequence in order to align settings corresponding to the common object in each of the images. Further embodiments herein can include: identifying settings corresponding to a unique object that is captured by fewer than all of the images 1320 in the sequence; and producing the predictor image (support plane image) to include a rendition of the common object and a rendition of the unique object.

As previously discussed, the encoder processor hardware can apply image-processing operations to align the images 1320 in FIG. 13. In one embodiment, the encoder processor hardware 1320 applies a first set of image processing operations to a first portion of a given image; the encoder processor hardware 1330 applies a second set of image processing operations to a second portion of a given image, the second portion of the given image can have a different number of elements from the first portion of the given image.

Each of the images 1320 in the sequence can include settings corresponding to a rendition of a particular object. The encoder processor hardware 1330 can be configured to combine the images by producing a rendition of the particular object in the predictor image (support plane information) based on a combination of settings corresponding with different renditions of the object in the sequence of images 1320.

As previously discussed, to allowing stitching, the single image or support plane can represents a larger field of view than a field of view represented by each of the images 1320.

In accordance with further embodiments, the encoder processor hardware 1330 can be configured to combine image settings via: stacking the images 1320 with respect to each other; processing one or more of the images in the stack to align settings of corresponding objects in the images 1320; and then combine settings of corresponding elements of the images in the stack to produce the predictor image or support plane information.

As previously discussed, the sequence of images in FIG. 13 can include at least a first image 1320-1 and a second image 1320-2. The encoder processor hardware 1330 can be configured to obtain the settings by retrieving a setting of an element in the first image 1320-, the setting of the element in the first image corresponding to a particular portion of an object rendered in the first image; and the encoder processor hardware 1330 can be configured to retrieves a setting of an element in the second image, the element in the second image corresponding to the particular portion of the object. Combining of the images can includes: computing a setting for a particular region of the object in the predictor image (support plane) based at least in part on a combination of the setting for the element in the first image 1320-1 and the setting of the element in the second image 1320-2.

In still further embodiments, the encoder processor hardware 1330 can be configured to produce meta information (encoded image data) indicating how many of the images 1320 were used to derive the predictor image or support plane.

FIG. 14 is an example diagram illustrating of a decoder processing according to embodiments herein. In view of the embodiments as discussed herein, decoder processing hardware 1430 substantially reproduces a sequence of multiple original images.

For example, the decoder processing hardware 1430 receives first encoded image data 1340-1 derived from multiple original images 1320-1 in a sequence. The first encoded image data 1340-1 specifies a set of common image element settings to be used as a baseline for reproducing each of the multiple original images 1320 in the sequence.

The decoder processing hardware 1430 receives encoded image data 1340-3 specifying adjustments such as "residuals". The decoder processing hardware 1430 reproduces a rendition of the multiple original images 1320 in the sequence based on application of the adjustments to preliminary renditions of the original images as reconstructed based at least in part on the set of common image elements. In other words, the decoder processing hardware 1430 produces a preliminary rendition of the images using the support plane of common settings. The decoder processing hardware 1430 applies the adjustments to the common image element settings to reproduce each respective image 1320.

In one embodiment, the decoder processing hardware 1430 substantially reproduces the renditions of the original images by: initially setting image elements in a first image of the multiple images to values based at least in part on the set of common image element settings; and initially setting image elements in a second image of the multiple images to values based at least in part on the set of common image element settings. The decoder processing hardware 1430 then retrieves a first set of adjustment information from the encoded image data 1340-3. The first set of adjustment information indicates how to modify settings of the preliminary rendition of image elements in the preliminary rendition of the first image derived from the encoded image data 1340-1 (support plane). The decoder processing hardware 1430 adjusts settings of the image elements in the preliminary rendition of the image as specified by the first set of adjustment information to reproduce a rendition of the first image 1320-1.

The decoder processing hardware 1430 retrieves a second set of adjustment information from the encoded data 1340-3; the second set of adjustment information indicates how to modify settings of the image elements in a rendition of the second image 1320-2 as derived from the support plane (encoded image data 1340-1). The decoder processing hardware 1430 adjusts settings of the image elements to the preliminary rendition of the second image as specified by the second set of adjustment information to reproduce a rendition of the second image 1320-2.

In accordance with further embodiments, the set of common element settings or combined attributes as captured by the encoded image data 1340-1 are derived from operations applied to settings of image elements in the original images over two or more images of the sequence. The common element settings as captured in the support plane (defined by encoded image data 1340-1) can correspond to one or more image renditions "predictor images".

In accordance with yet further embodiments, the encoded image data 1340 can include, aside from information corresponding to common element settings associated with multiple images 1320, also metadata information (such as "meta-information") such as encoded image data 1340-2 specifying operations to be used to reconstruct preliminary renditions of the multiple images in the sequence based at least in part on the common element settings as specified by the encoded image data 1340-1. Accordingly, in one embodiment, the decoder processing hardware 1430 uses the encoded image data 1340-2 to identify operations to be used reproduce the respective images 1320.

The meta-information in encoded image data 1340-2 for each given preliminary image rendition can specify what portion of the common element settings (as captured by encoded image data 1340-1) are processed to produce a preliminary image rendition for the image 1340.

The operations (as specified by encoded image data 1340-2) to reconstruct a given preliminary image rendition can include motion compensation operations to common element settings (as captured by encoded image data 1340-1). In such an instance, the decoder processing hardware 1430 applies a first set of image processing operations to a first portion of common element settings (encoded image data 1340-1), as specified by the meta-information (encoded image data 1340-2). The decoder processing hardware 1430 applies a second set of image processing operations to a second portion of common element settings (encoded image data 1340-1), as specified by the meta-information encoded image data 1340-2).

In one embodiment, any of the preliminary image renditions reconstructed based at least in part on the set of common image elements (encoded image data 1340-1) is generated for any of the original images 1320 in the sequence before having substantially reproduced any of the original images 1320 in the sequence.

As previously discussed, in one embodiment, the multiple original images 1320 correspond to or represent adjustment information. The adjustment information can specify adjustments ("residual images") to be combined with other given images in order to produce the rendition of the images 1320.

Additional Decoder Embodiments

In view of the embodiments as discussed herein, the decoder processing hardware 1430 can be configured to receive first image data such as "first predictor image data" or support plane as derived from encoding (by encoder processor hardware 1330) of a first grouping of images 1320 in a sequence. The decoder processing hardware 1430 receives second image data such as "second predictor image data" derived from encoding a second grouping of images in the sequence. The first grouping of images can be disposed adjacent to the second grouping of images in the sequence. By way of a non-limiting example, the decoder processing hardware 1430 utilizes a combination of the first predictor image data and the second predictor image data to reconstruct a rendition of the first grouping of images in the sequence.

In accordance with further embodiments, the first grouping of images can be a first set of contiguous images (one next to another) in the sequence. The second grouping of images can be a second set of contiguous images (one next to another) in the sequence.

In one embodiment, the decoder processing hardware 1430 can receive the first predictor image data as a first hierarchy of image data decoded from a lowest space-time resolution to a highest space-time resolution. The decoder processing hardware 1430 can receive the second predictor image data as a second hierarchy of image data decoded from a lowest space-time resolution to a highest space-time resolution. In such an instance, the decoder processing hardware 1430 utilizes the combination of the first predictor image data and at least a portion of the second predictor image data to reconstruct the first grouping of images in the sequence. This operation can include: utilizing the first predictor image data to produce an image rendition at a given tier in the first hierarchy; utilizing the second predictor image data to produce an image rendition at the given tier in the second hierarchy; and producing at least one image rendition at a next higher tier above the given tier based on combining at least the image rendition at the given tier in the first hierarchy and the image rendition at the given tier in the second hierarchy. Combining of at least the image rendition at the given tier in the first hierarchy and the image rendition at the given tier in the second hierarchy can include performing image-processing operations.

In view of further embodiments, the decoder processing hardware 1430 can be configured to combine an image rendition derived from first encoded data and an image rendition derived from second encoded data to reproduce at least one of the images in the first grouping of images.

As previously discussed, the decoder processing hardware 1430 can utilize the combination of the first predictor image data and the second predictor image data to reconstruct the first grouping of images in the sequence. This operation can further include: for at least one given image in the first grouping of images: combining at least a first image produced by means of image processing operations that comprise performing upsampling operations on an image rendition in the first hierarchy and a second image produced by means of image processing operations that comprise performing upsampling operations on an image rendition in the second hierarchy to reproduce the given image in the first grouping of images. The decoder processing hardware 1430 can further receive meta information. The decoder processing hardware 1430 utilizes the meta information to identify the images of a lower tier to process in order to produce a given image of a higher tier.

Note again that techniques herein are well suited for encoding and decoding in hierarchical systems. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While embodiments herein have been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
   receiving image settings for each of multiple images in a sequence;
   combining the image settings of the multiple images in the sequence to produce image settings of a baseline image, the baseline image being representative of the sequence of multiple images; and
   for each respective image in the sequence of multiple images, producing hierarchical reconstruction data indicating corresponding image processing operations and adjustment data specifying how to reconstruct a corresponding rendition of the respective image from the baseline image.

2. The method as in claim 1, wherein combining the image settings includes:
   overlaying the multiple images with respect to each other; and
   using the overlaid images to produce the baseline image representative of the sequence.

3. The method as in claim 1, wherein each of the multiple images in the sequence is received in accordance with a first resolution, the method further comprising:
   producing the baseline image to be at a second resolution, the second resolution lower than the first resolution.

4. The method as in claim 3, wherein each of the multiple images in the sequence includes a rendition of a particular object; and
   wherein combining the image settings includes: producing a rendition of the particular object in the baseline image based on a combination of renditions of the particular object in each of the multiple images.

5. The method as in claim 1, wherein a first image of the multiple images in the sequence includes settings corresponding to a respective unique visual artifact not found in images other than the first image; and
   wherein combining includes producing the baseline image to include settings corresponding to the unique visual artifact.

6. The method as in claim 1, wherein the sequence of multiple images includes at least a first image and a second image;
   wherein receiving the image settings includes:
      retrieving a setting of an element in the first image, the element in the first image representing a particular portion of an object in the first image;
      retrieving a setting of an element in the second image, the element in the second image representing the particular portion of the object in the second image.

7. The method as in claim 6, wherein combining the image settings includes:
   computing a setting for the particular portion of the object in the baseline image based at least in part on a combination of the setting for the element in the first image and the setting for the element in the second image.

8. The method as in claim 1, wherein the baseline image is of a lower resolution than a resolution of the multiple images in the sequence.

9. The method as in claim 8, wherein each of the multiple images in the sequence includes settings corresponding to a rendition of a particular object; and
 wherein combining the multiple images includes: producing a rendition of the particular object in the baseline image based on a combination of settings corresponding with different renditions of the object in the sequence of multiple images.

10. The method as in claim 8, wherein combining image settings includes:
 stacking the multiple images with respect to each other;
 processing one or more of the multiple images in the stack to align settings of corresponding objects in the multiple images; and
 via combining settings of corresponding elements of the multiple images in the stack, producing the baseline image.

11. The method as in claim 8, wherein the sequence of multiple images includes at least a first image and a second image;
 wherein receiving the image settings includes:
  retrieving a setting of an element in the first image, the setting of the element in the first image corresponding to a particular portion of an object rendered in the first image; and
  retrieving a setting of an element in the second image, the element in the second image corresponding to the particular portion of the object in the second image.

12. The method as in claim 11, wherein combining the image settings includes:
 computing a setting for a particular region of the object in the baseline image based at least in part on a combination of the setting of the element in the first image and the setting of the element in the second image.

13. The method as in claim 1 further comprising:
 producing meta information indicating how many of the multiple images in the sequence were used to derive the baseline image.

14. The method as in claim 1, wherein the baseline image includes multiple renditions of a same object present in a set of two of the multiple images in the sequence.

15. The method as in claim 14, wherein the set of two images in the sequence includes a first image and a second image; and
 wherein a rendition of the common object in the first image is disposed at a spatially different location than a rendition of the object in the second image.

16. The method as in claim 1, wherein combining the image settings includes:
 temporally combining the multiple images in the sequence; and
 downsampling the temporally combined images to produce the settings of the baseline image.

17. The method as in claim 16 further comprising:
 producing the hierarchical reconstruction data based on the downsampling.

18. The method as in claim 1, wherein the image processing operation includes an upsampling operation.

19. The method as in claim 16, wherein the image settings for the multiple images in the sequence define the multiple images at a first resolution; and
 wherein the image settings of the baseline image are defined at a second resolution, the second resolution lower than the first resolution.

20. The method as in claim 18 further comprising:
 producing the hierarchical reconstruction data to specify at least one upsample operation to apply to the baseline image to reproduce a first image in the sequence.

21. The method as in claim 1 further comprising:
 applying at least one downsampling operation to produce the settings of the baseline image.

22. Computer-readable storage hardware having instructions stored thereon, the instructions, when carried out by computer processor hardware, cause the computer processor hardware to:
 receive image settings for each of multiple images in a sequence;
 combine the image settings of the multiple images in the sequence to produce image settings of a baseline, the baseline image being representative of the sequence of multiple images; and
 for each respective image in the sequence, produce hierarchical reconstruction data indicating corresponding image processing operations and adjustment data specifying how to reconstruct a corresponding rendition of the respective image from the baseline image.

\* \* \* \* \*